United States Patent
Watanabe

(10) Patent No.: US 12,397,507 B2
(45) Date of Patent: Aug. 26, 2025

(54) THREE-DIMENSIONAL MODELING DEVICE, METHOD OF CALIBRATING THREE-DIMENSIONAL MODELING DEVICE, AND METHOD OF MANUFACTURING THREE-DIMENSIONAL SHAPED ARTICLE

(71) Applicant: SEIKO EPSON CORPORATION, Tokyo (JP)

(72) Inventor: Manabu Watanabe, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 436 days.

(21) Appl. No.: 17/807,120

(22) Filed: Jun. 15, 2022

(65) Prior Publication Data
US 2022/0402213 A1 Dec. 22, 2022

(30) Foreign Application Priority Data
Jun. 17, 2021 (JP) ................. 2021-100584

(51) Int. Cl.
*B29C 64/393* (2017.01)
*B29C 64/118* (2017.01)
(Continued)

(52) U.S. Cl.
CPC .......... *B29C 64/393* (2017.08); *B29C 64/209* (2017.08); *B29C 64/232* (2017.08);
(Continued)

(58) Field of Classification Search
None
See application file for complete search history.

(56) References Cited

U.S. PATENT DOCUMENTS

| 7,229,144 B2 | 6/2007 | Nielsen et al. |
| 10,291,816 B2 | 5/2019 | Mizes et al. |

(Continued)

FOREIGN PATENT DOCUMENTS

| CN | 105818376 | 8/2016 |
| JP | 2004-151104 | 5/2004 |

(Continued)

*Primary Examiner* — Matthew G Marini
(74) *Attorney, Agent, or Firm* — WORKMAN NYDEGGER

(57) ABSTRACT

A three-dimensional modeling device includes a first ejection section configured to eject a first material, a second ejection section configured to eject a second material, a drive section configured to move each of the first ejection section and the second ejection section relatively to a stage, and a control section. The control section executes a calibration process including a first process of ejecting the first material from the first ejection section to thereby shape a first portion and a second portion shaped like straight lines arranged in parallel to each other in the calibrating shaped article, a second process of ejecting the second material from the second ejection section to thereby shape a third portion shaped like a straight line arranged between the first portion and the second portion in the calibrating shaped article, and a third process of adjusting a relative position of the second ejection section to the first ejection section in accordance with a correction value obtained based on relative positions of the third portion to the first portion and the second portion, and the control section executes the first process and the second process once again when the third process is executed in the calibration process.

15 Claims, 14 Drawing Sheets

(51) Int. Cl.
*B29C 64/209* (2017.01)
*B29C 64/232* (2017.01)
*B29C 64/236* (2017.01)
*B29C 64/245* (2017.01)
*B33Y 10/00* (2015.01)
*B33Y 30/00* (2015.01)
*B33Y 50/02* (2015.01)

(52) U.S. Cl.
CPC .......... *B29C 64/236* (2017.08); *B29C 64/245* (2017.08); *B33Y 10/00* (2014.12); *B33Y 50/02* (2014.12); *B29C 64/118* (2017.08); *B33Y 30/00* (2014.12)

(56) References Cited

U.S. PATENT DOCUMENTS

| | | |
|---|---|---|
| 10,791,245 B2 | 9/2020 | Mizes et al. |
| 10,994,490 B1* | 5/2021 | Matusik ................. B29C 64/245 |
| 2004/0085377 A1 | 5/2004 | Nielsen et al. |
| 2016/0214323 A1* | 7/2016 | Mizes ...................... H04N 1/40 |
| 2019/0230248 A1 | 7/2019 | Mizes et al. |

FOREIGN PATENT DOCUMENTS

| | | |
|---|---|---|
| JP | 2008-513252 | 5/2008 |
| JP | 2010-042565 | 2/2010 |
| JP | 2020-011474 | 1/2020 |
| WO | 2006/034012 | 3/2006 |

\* cited by examiner

| OPERATION CONTENT | TIME AND DATE | MATERIAL | X CORRECTION VALUE (mm) | Y CORRECTION VALUE (mm) | Z CORRECTION VALUE (mm) |
|---|---|---|---|---|---|
| REPLACEMENT OF FIRST NOZZLE | 2020/9/15 8:00 | PLA | — | — | — |
| REPLACEMENT OF SECOND NOZZLE | 2020/9/15 8:15 | PVA | — | — | — |
| CALIBRATION PROCESS | 2020/9/15 8:30 | PLA/PVA | 1.55 | 0.50 | 0.25 |
| REPLACEMENT OF FIRST NOZZLE | 2020/9/19 8:00 | ABS | — | — | — |
| REPLACEMENT OF SECOND NOZZLE | 2020/9/19 8:15 | HIPS | — | — | — |
| CALIBRATION PROCESS | 2020/9/19 8:30 | ABS/HIPS | 1.50 | 0.45 | 0.20 |
| REPLACEMENT OF FIRST NOZZLE | 2020/9/23 9:00 | PLA | — | — | — |
| REPLACEMENT OF SECOND NOZZLE | 2020/9/23 9:15 | PVA | — | — | — |
| CALIBRATION PROCESS | 2020/9/23 9:30 | PLA/PVA | 1.55 | 0.50 | 0.25 |

THREE-DIMENSIONAL MODELING DEVICE, METHOD OF CALIBRATING THREE-DIMENSIONAL MODELING DEVICE, AND METHOD OF MANUFACTURING THREE-DIMENSIONAL SHAPED ARTICLE

The present application is based on, and claims priority from JP Application Serial Number 2021-100584, filed Jun. 17, 2021, the disclosure of which is hereby incorporated by reference herein in its entirety.

BACKGROUND

1. Technical Field

The present disclosure relates to a three-dimensional modeling device, a method of calibrating a three-dimensional modeling device, and a method of manufacturing a three-dimensional shaped article.

2. Related Art

In JP-A-2020-011474 (Document 1), there is disclosed a three-dimensional modeling device using a thermal-melting stacking method. This three-dimensional modeling device is provided with a feeding section for feeding a filament material into an ejection section, a feed amount detection section for detecting an amount of feed of the filament material to be fed to the ejection section, and an ejection amount detection section for detecting an amount of ejection of the material ejected from the ejection section, and derives a relationship between the feed amount and the ejection amount to adjust the feed amount so that a desired ejection amount is achieved.

As in Document 1 described above, by adjusting the amount of feed of the material to be fed into the ejection section, it is possible to shape a three-dimensional shaped article with high dimensional accuracy. However, in a three-dimensional modeling device having a modeling nozzle for ejecting a modeling material and a supporting nozzle for ejecting a support material, due to a misalignment in relative position of the supporting nozzle to the modeling nozzle, there is a possibility that the supporting nozzle makes contact with a modeling layer formed of the modeling material to thereby deform the modeling layer, or a possibility that a position of a support layer formed of the support material is shifted to fail to sufficiently support the modeling layer, and thus, the modeling layer deforms during the modeling process. In other words, due to the misalignment of the relative position of the supporting nozzle to the modeling nozzle, there is a possibility that it becomes unachievable to shape the three-dimensional shaped article with high dimensional accuracy. Such a problem as described above occurs not only in the three-dimensional modeling device provided with the modeling nozzle and the supporting nozzle, but also in a three-dimensional modeling device provided with a plurality of modeling nozzles.

SUMMARY

According to a first aspect of the present disclosure, there is provided a three-dimensional modeling device. The three-dimensional modeling device includes a first ejection section configured to eject a first material toward a stage, a second ejection section configured to eject a second material toward the stage, a drive section configured to move each of the first ejection section and the second ejection section relatively to the stage, and a control section configured to control the first ejection section, the second ejection section, and the drive section. The control section executes a calibration process including a first process of ejecting the first material from the first ejection section to thereby shape a first portion and a second portion shaped like straight lines arranged in parallel to the stage and in parallel to each other in a calibrating shaped article to be shaped on the stage, a second process of ejecting the second material from the second ejection section to thereby shape a third portion shaped like a straight line arranged between the first portion and the second portion in the calibrating shaped article, and a third process of controlling the drive section in accordance with a correction value obtained based on relative positions of the third portion to the first portion and the second portion to thereby adjust a relative position of the second ejection section to the first ejection section. The control section executes the first process and the second process once again when the third process is executed in the calibration process.

According to a second aspect of the present disclosure, there is provided a method of calibrating a three-dimensional modeling device provided with a first ejection section configured to eject a first material toward a stage, and a second ejection section configured to eject a second material toward the stage. The method of calibrating the three-dimensional modeling device includes a first step of ejecting the first material from the first ejection section to thereby shape a first portion and a second portion shaped like straight lines arranged in parallel to the stage and in parallel to each other in a calibrating shaped article to be shaped on the stage, a second step of ejecting the second material from the second ejection section to thereby shape a third portion shaped like a straight line arranged between the first portion and the second portion in the calibrating shaped article, and a third step of adjusting a relative position of the second ejection section to the first ejection section in accordance with a correction value obtained based on relative positions of the third portion to the first portion and the second portion. When the third step is executed, the first step and the second step are executed once again.

According to a third aspect of the present disclosure, there is provided a method of manufacturing a three-dimensional shaped article. The method of manufacturing a three-dimensional shaped article includes a shaping step of shaping the three-dimensional shaped article using a first ejection section configured to eject a first material toward a stage, and a second ejection section configured to eject a second material toward the stage, and a calibration step of adjusting a relative position of the second ejection section to the first ejection section in advance of the shaping step. The calibration step includes a first step of ejecting the first material from the first ejection section to thereby shape a first portion and a second portion shaped like straight lines arranged in parallel to the stage and in parallel to each other in a calibrating shaped article to be shaped on the stage, a second step of ejecting the second material from the second ejection section to thereby shape a third portion shaped like a straight line arranged between the first portion and the second portion in the calibrating shaped article, and a third step of adjusting a relative position of the second ejection section to the first ejection section in accordance with a correction value obtained based on relative positions of the third portion to the first portion and the second portion. In the calibration step, when the third step is executed, the first step and the second step are executed once again.

BRIEF DESCRIPTION OF THE DRAWINGS

FIG. 13 is an explanatory diagram showing an operation history display screen.

DESCRIPTION OF EXEMPLARY EMBODIMENTS

A. First Embodiment

Figure 1:
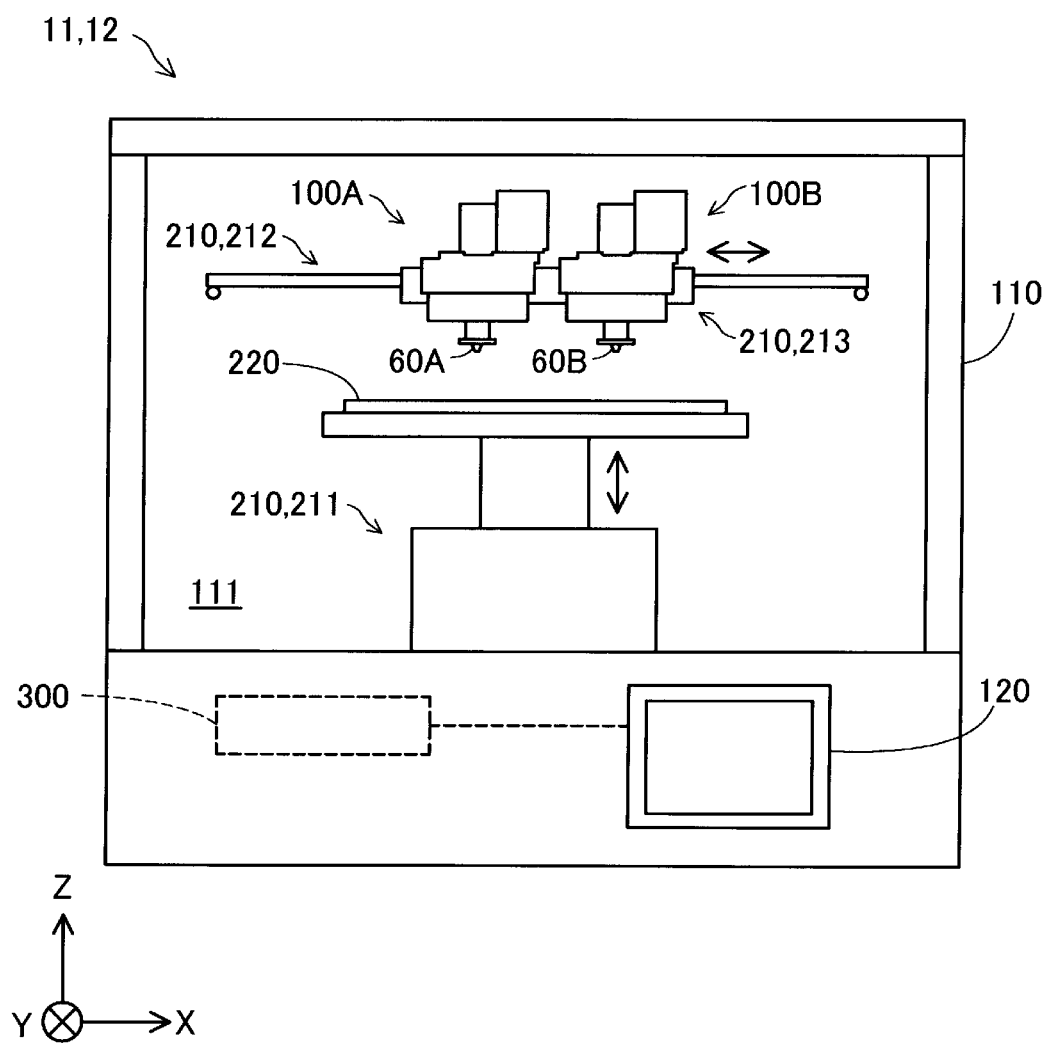
FIG. 1 is a front view showing a schematic configuration of a three-dimensional modeling device according to a first embodiment.
Figure 2:
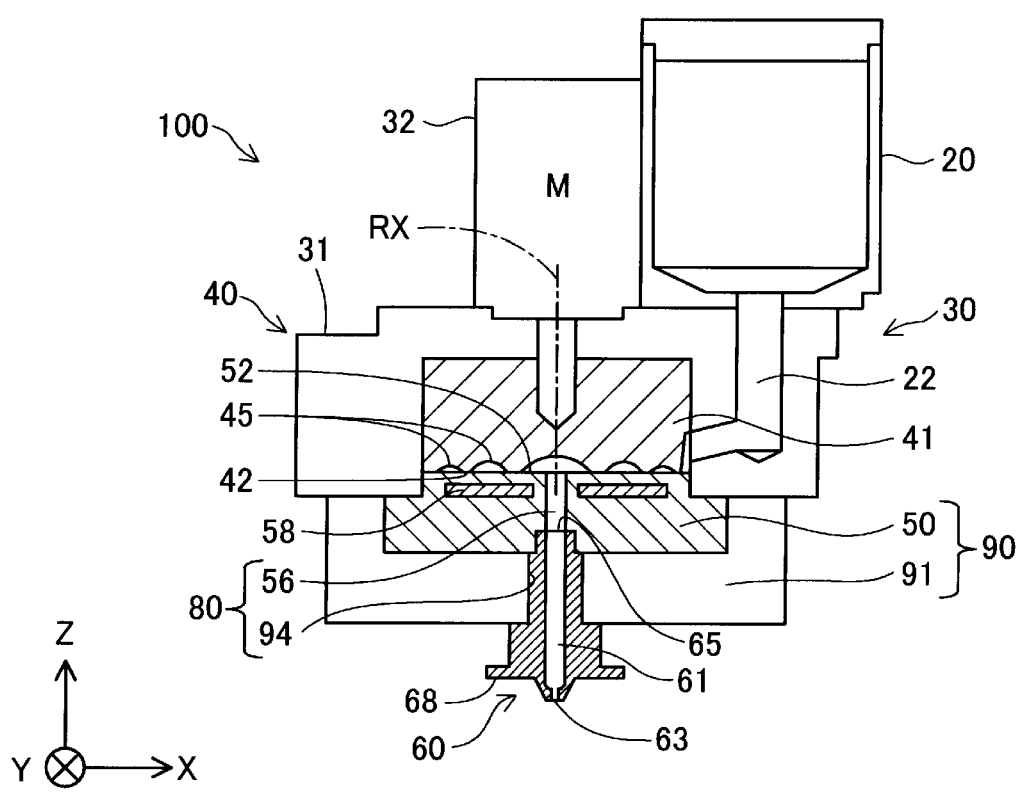
FIG. 2 is an explanatory diagram showing a schematic configuration of an ejection section in the first embodiment.

FIG. 1 is a front view showing a schematic configuration of a three-dimensional modeling device 11 according to a first embodiment. In FIG. 1, there are shown arrows respectively representing X, Y, and Z axes as three coordinate axes perpendicular to each other. The X axis and the Y axis are the coordinate axes along a horizontal plane, and the Z axis is the coordinate axis along a vertical direction. The arrows respectively representing the X, Y, and Z axes are arbitrarily illustrated also in the drawings in FIG. 2 and following diagrams so that the directions pointed by the arrows correspond to those in FIG. 1. In FIG. 1, FIG. 2, and the following diagrams, a direction pointed by the arrow representing the X axis is referred to as a +X direction or "right," and an opposite direction thereto is referred to as a −X direction or "left" in some cases. A direction pointed by the arrow representing the Y axis is referred to as a +Y direction or "rear," and an opposite direction thereto is referred to as a −Y direction or "front" in some cases. A direction pointed by the arrow representing the Z axis is referred to as a +Z direction or "upper side," and an opposite direction thereto is referred to as a −Z direction or "lower side" in some cases. It should be noted that the X axis is referred to as a first axis, and the Y axis is referred to as a second axis in some cases. The X axis is referred to as the second axis, and the Y axis is referred to as the first axis in some cases.

In the present embodiment, the three-dimensional modeling device 11 is provided with a chassis 110, an operation panel 120, a first ejection section 100A, a second ejection section 100B, a drive section 210, a stage 220, and a control section 300.

The chassis 110 has a modeling space 111 inside. The chassis 110 is provided with, for example, an opening part for communicating the modeling space 111 and the outside with each other. The chassis 110 can be provided with a door or the like for opening and closing the opening part for communicating the modeling space 111 and the outside with each other. In the modeling space 111, there are arranged a first ejection section 100A, a second ejection section 100B, and a stage 220. An upper surface of the stage 220 is arranged in parallel to the X axis and the Y axis. It should be noted that the stage 220 is referred to as a platen in some cases.

The operation panel 120 is disposed in front of the chassis 110. The operation panel 120 is formed of, for example, a liquid crystal display or an organic EL display of a touch panel type. The operation panel 120 is coupled to the control section 300.

The first ejection section 100A and the second ejection section 100B are arranged above the stage 220. In the present embodiment, the first ejection section 100A and the second ejection section 100B are arranged horizontally adjacent to each other. When not particularly described, the second ejection section 100B is the same in configuration as the first ejection section 100A. In the following description, when describing the first ejection section 100A and the second ejection section 100B without particularly discriminating the first ejection section 100A and the second ejection section 100B from each other, the first ejection section 100A and the second ejection section 100B are simply referred to as ejection sections 100. The ejection section 100 is referred to as an ejection head, an injection section, an injection head, an extrusion section, an extrusion head, or simply as a head. It should be noted that in another embodiment, the first ejection section 100A and the second ejection section 100B can be arranged adjacent to each other in an anteroposterior direction.

The first ejection section 100A has a first nozzle 60A, and the second ejection section 100B has a second nozzle 60B. The first ejection section 100A ejects a first material from the first nozzle 60A toward the stage 220, and the second ejection section 100B ejects a second material from the second nozzle 60B toward the stage 220. The term "ejection" mentioned here includes the meaning of "injection" or "extrusion." In the following description, when describing the first material and the second material without particularly discriminating the first material and the second material from each other, the first material and the second material are simply referred to as materials. When describing the first nozzle 60A and the second nozzle 60B without particularly discriminating the first nozzle 60A and the second nozzle 60B from each other, the first nozzle 60A and the second nozzle 60B are simply referred to as nozzles 60. The nozzle 60 is referred to as a nozzle chip or a chip in some cases. The first nozzle 60A and the second nozzle 60B can be nozzles the same in type as each other, or can also be nozzles different in type from each other. For example, the first nozzle 60A and the second nozzle 60B can be different in nozzle aperture from each other.

In the present embodiment, the first material is a modeling material for forming a product portion of a three-dimensional shaped article, and the second material is a support material for forming a support portion for supporting the product portion in the middle of the modeling. As the modeling material, it is possible to use, for example, a material obtained by combining ABS resin, polylactic acid (PLA), polyetherimide (PEI), or nylon 12 and carbon fiber with each other. As the support material, there can be used, for example, HIPS (High Impact Polystyrene) or polyvinyl alcohol (PVA). It should be noted that in another embodiment, it is possible for the first material and the second material to be modeling materials. In this case, it is possible for the first material and the second material to be the modeling materials the same in type as each other, or it is possible for the first material and the second material to be the modeling materials different in type from each other.

The drive section 210 changes relative positions of the first ejection section 100A and the second ejection section 100B with respect to the stage 220. In the present embodiment, the drive section 210 has a first drive section 211 for moving the stage 220 along the Z axis, and a second drive section 212 for moving the first ejection section 100A and the second ejection section 100B along the X axis and the Y axis. The first drive section 211 is configured as an elevating device, and is provided with a motor for moving the stage 220 along the Z axis. The second drive section 212 is configured as a horizontal carrier device, and is provided with a motor for translating the first ejection section 100A and the second ejection section 100B along the X axis, and a motor for translating them along the Y axis. Each of the motors is driven under the control by the control section 300. It should be noted that in another embodiment, there can be adopted a configuration in which the first drive section 211 moves the stage 220 along the X axis and the Y axis, and the second drive section 212 moves the first ejection section 100A and the second ejection section 100B along the Z axis. It is possible to adopt a configuration in which the first drive section 211 is not provided with the drive section 210, and the second drive section 212 moves the first ejection section 100A and the second ejection section 100B along the three axes of X, Y, and Z. It is possible to adopt a configuration in which the second drive section 212 is not provided with the drive section 210, and the first drive section 211 moves the stage 220 along the three axes of X, Y, and Z.

In the present embodiment, the drive section 210 further has a third drive section 213 for changing a relative position of the second ejection section 100B with respect to the first ejection section 100A. The third drive section 213 is disposed between the second ejection section 100B and the second drive section 212, and moves the second ejection section 100B along the three axes of X, Y, and Z. The third drive section 213 is configured by combining electric actuators driven under the control by, for example, the control section 300. It should be noted that in another embodiment, the third drive section 213 is disposed between the first ejection section 100A and the second drive section 212, and moves the first ejection section 100A along the three axes of X, Y, and Z. When the second drive section 212 is not provided, the third drive section 213 can be disposed between the first ejection section 100A or the second ejection section 100B and the chassis 110.

The control section 300 is formed of a computer provided with at least one processor, a memory, and an input/output interface for performing input/output of a signal with the outside. The control section 300 controls the first ejection section 100A, the second ejection section 100B, and the drive section 210. In the present embodiment, it is possible for the control section 300 to execute a three-dimensional modeling process and a calibration process described later by the processor executing a program or a command retrieved in the memory. It should be noted that it is also possible for the controller 300 to be formed of a combination of a plurality of circuits instead of the computer.

FIG. 2 is an explanatory diagram showing a schematic configuration of the ejection section 100 in the present embodiment. The ejection section 100 is provided with a material housing section 20, a plasticizing mechanism 30, and the nozzle 60 described above.

In the material housing section 20, there is housed the material in the form of a pellet or a powder. In the present embodiment, the material housing section 20 is formed of a hopper. A feed path 22 for communicating the material housing section 20 and the plasticizing mechanism 30 to each other is disposed below the material housing section 20. The material housed in the material housing section 20 is fed to the plasticizing mechanism 30 via the feed path 22.

The plasticizing mechanism 30 plasticizes at least a part of the material fed from the material housing section 20 to feed the material thus plasticized to the nozzle 60. The term "plasticization" is a concept including melting, and means changing an object from a solid state to a state having fluidity. Specifically, in the case of a material in which glass transition occurs, the plasticization means that the temperature of the material is made equal to or higher than the glass-transition point. In the case of a material in which the glass transition does not occur, the plasticization means that the temperature of the material is made equal to or higher than a melting point.

The plasticizing mechanism 30 is provided with a material carrying mechanism 40 and a heating block 90. The material carrying mechanism 40 has a function of carrying the material fed via the feed path 22. In the present embodiment, the material carrying mechanism 40 is provided with a screw case 31, a drive motor 32, and a flat screw 41. It should be noted that the flat screw 41 is referred to as a screw or a scroll in some cases.

In the screw case 31, there is housed the flat screw 41. A bottom surface of the screw case 31 is provided with an opening part. To the bottom surface of the screw case 31, there is fixed a barrel 50 described later so as to close the opening part described above. In a space surrounded by the screw case 31 and the barrel 50, there is arranged the flat screw 41.

The drive motor 32 is fixed to an upper surface of the screw case 31. An output shaft of the drive motor 32 is coupled to the flat screw 41 so as to penetrate the screw case 31. The output shaft of the drive motor 32 can directly be coupled to the flat screw 41, or can also be coupled to the flat screw 41 via a reduction gear. The drive motor 32 is driven under the control by the control section 300.

The flat screw 41 has a substantially cylindrical shape having a height in a direction along a central axis RX smaller than the diameter. The bottom surface of the flat screw 41, namely a surface opposed to the barrel 50, is provided with a groove forming surface 42. On the groove forming surface 42, there are formed screw grooves 45. A more specific configuration at the groove forming surface side will be described later. Due to the torque generated by the drive motor 32, the flat screw 41 rotates around the central axis RX. By the flat screw 41 rotating, there is carried the material which has been fed from the material housing section 20 to an area between the flat screw 41 and the barrel 50.

The heating block 90 has a function of heating the material carried by the material carrying mechanism 40. In the present embodiment, the heating block 90 is provided with the barrel 50, a heater 58, and a case part 91.

The barrel 50 has a screw-opposed surface 52 opposed to the groove forming surface 42 of the flat screw 41. At the center of the screw-opposed surface 52, there is disposed an opening part of a communication hole 56. The opening part of the communication hole 56 provided to the screw-opposed surface 52 is arranged on an extended line of the central axis RX of the flat screw 41. The communication hole 56 penetrates the barrel 50.

In the present embodiment, the heater 58 is arranged inside the barrel 50. The heater 58 is controlled by the control section 300, and is heated to a melting temperature for plasticizing the material. The melting temperature differs by a type of the material to be used, and is, for example, no lower than the glass-transition point or the melting point of the material. When the material is ABS resin, the melting temperature is set to, for example, a temperature no lower than about 110° C. which is the glass-transition point of ABS resin. It should be noted that in the present embodiment, the heater 58 can be arranged outside the barrel 50.

The case part 91 is arranged so as to cover a surface at an opposite side to the screw-opposed surface 52 of the barrel 50, namely a bottom surface of the barrel 50. The case part 91 is provided with a through hole 94. The through hole 94 of the case part 91, and a lower end part of the communication hole 56 of the barrel 50 constitute an attaching hole 80 for detachably fixing the nozzle 60. For example, a side surface of the nozzle 60 is provided with an external thread, the attaching hole 80 is provided with an internal thread, and the nozzle 60 is fixed to the attaching hole 80 using the external thread and the internal thread.

The nozzle 60 is fixed to the attaching hole 80 so as to aim the tip portion of the nozzle 60 downward. In a rear end portion of the nozzle 60, there is disposed a nozzle inflow port 65 communicated with the communication hole 56. In a tip portion of the nozzle 60, there is disposed a nozzle opening 63 for ejecting the plasticized material. The nozzle 60 is provided with a nozzle flow channel 61 for communicating the nozzle inflow port 65 and the nozzle opening 63 with each other. The nozzle 60 ejects the material inflows into the nozzle flow channel 61 from the nozzle inflow port 65 from the nozzle opening 63 toward the stage 220.

In the present embodiment, the nozzle 60 is provided with a shield 68 shaped like a flange. The shield is disposed so as to project outward from the side surface of the nozzle 60. The shield 68 is arranged between the nozzle opening 63 and the heating block 90 in the Z axis. By disposing the shield 68, it is possible to prevent the heat from the heating block 90 from being transferred to the material stacked on the stage 220.

Figure 3:
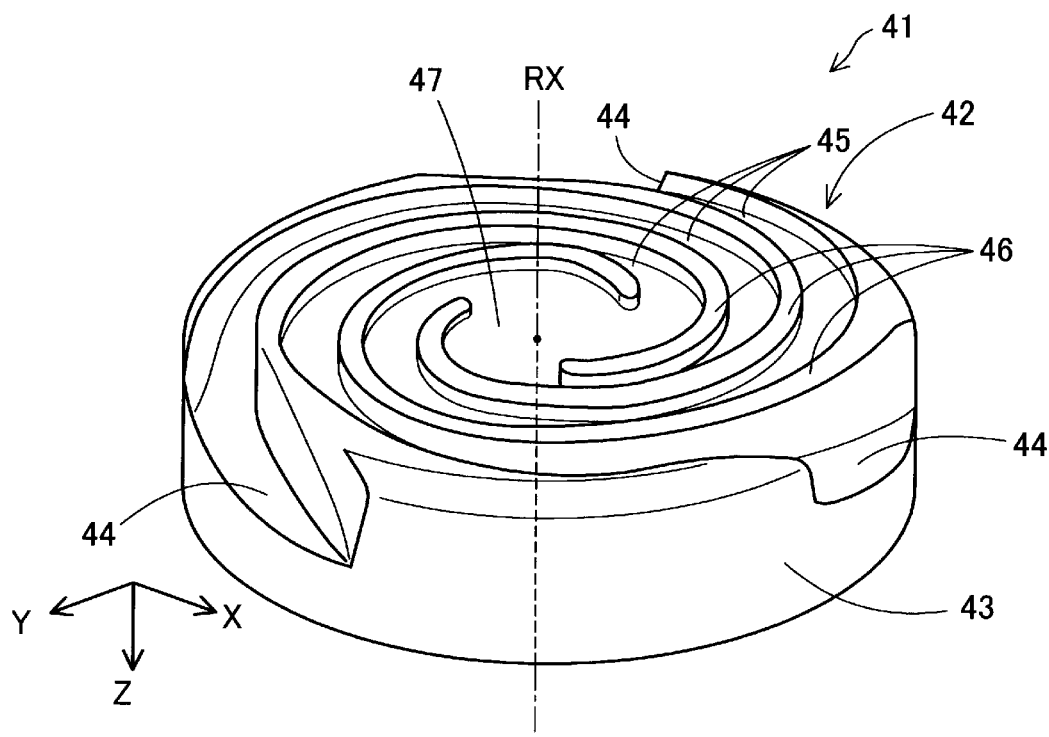
FIG. 3 is a schematic perspective view showing a configuration at a groove forming surface side of a flat screw.

FIG. 3 is a schematic perspective view showing a configuration at the groove forming surface 42 side of the flat screw 41. In FIG. 3, the position of the central axis RX of the flat screw 41 is represented by the dashed-dotted line. As described above, the groove forming surface 42 is provided with the grooves 45. A screw central portion 47 as a central portion of the groove forming surface 42 of the screw 41 is formed as a recess to which one ends of the grooves 45 are coupled. The screw central portion 47 is opposed to the communication hole 56 of the barrel 50. The screw central portion 47 crosses the central axis RX.

The screw grooves 45 of the flat screw 41 each constitute a so-called scroll groove. The screw grooves 45 each extend in a vertical manner from the screw central portion 47 toward an outer circumference of the flat screw 41 so as to draw an arc. The screw grooves 45 can also be formed so as to extend forming an involute-curved shape or a spiral shape. The groove forming surface 42 is provided with protruding line parts 46 each constituting a sidewall part of the screw groove 45, and extending along each of the screw grooves 45. The screw grooves 45 each continue to a material introduction port 44 formed on a side surface 43 of the flat screw 41. The material introduction port 44 is a portion for receiving the material fed via the feed path 22 of the material housing section 20.

In FIG. 3, there is shown an example of the flat screw 41 having the three screw grooves 45 and the three protruding line parts 46. The number of the screw grooves 45 and the number of the protruding line parts 46 provided to the flat screw 41 are not limited to three, and it is possible to disposed just one screw groove 45, or it is possible to dispose two or more screw grooves 45. Further, in FIG. 3, there is illustrated an example of the flat screw 41 having the material introduction ports 44 formed at three places. The number of the material introduction ports 44 provided to the flat screw 41 is not limited to three, and the material introduction port 44 can be disposed at just one place, or can also be disposed at two or more places.

Figure 4:
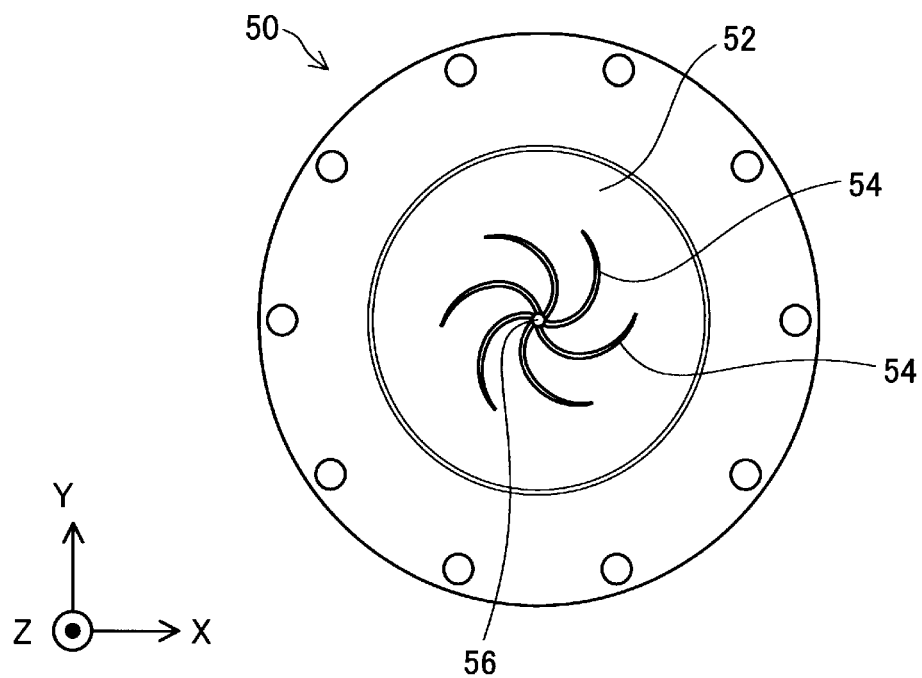
FIG. 4 is a top view showing a configuration at a screw-opposed surface side of a barrel.

FIG. 4 is a top view showing a configuration at the screw-opposed surface 52 side of the barrel 50. As described above, at the center of the screw-opposed surface 52, there is formed the communication hole 56. On the periphery of the communication hole 56 in the screw-opposed surface 52, there is formed a plurality of guide grooves 54. Each of the guide grooves 54 is coupled to the communication hole 56 at one end, and extends in a vertical manner from the communication hole 56 toward the outer circumference of the screw-opposed surface 52. Each of the guide grooves 54 has a function of guiding the material to the communication hole 56. It should be noted that the one ends of the guide grooves 54 are not required to be coupled to the communication hole 56. Further, it is not required to provide the guide grooves 54 to the barrel 50.

Figure 5:
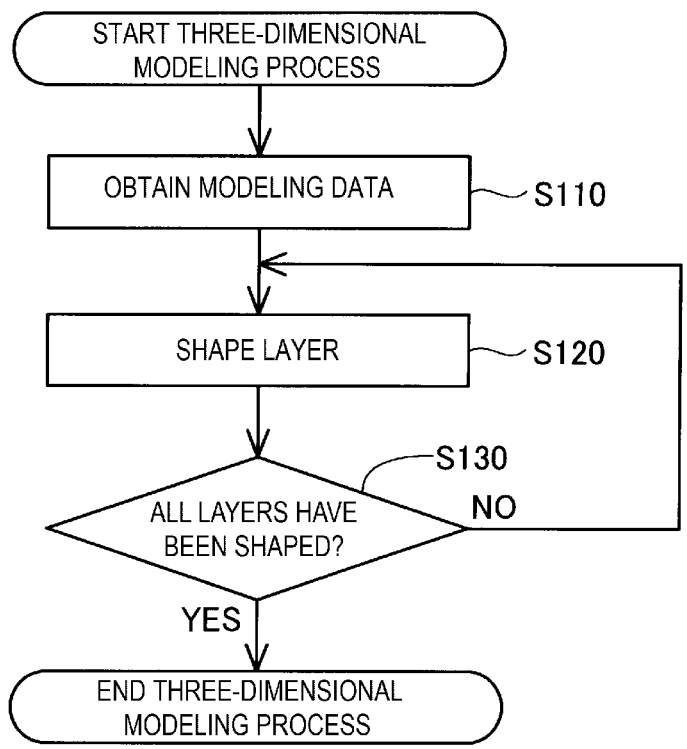
FIG. 5 is a flowchart showing a content of a three-dimensional modeling process.

FIG. 5 is a flowchart showing a content of a three-dimensional modeling process in the present embodiment. The processing is started when the control section 300 has received a predetermined operation from the user. The processing is started when, for example, a start button for the three-dimensional modeling process displayed in the operation panel 120 is tapped.

First, in the step S110, the control section 300 obtains modeling data. The control section 300 obtains the modeling data from, for example, an external computer or a recording medium. The modeling data includes first tool path data representing a movement path of the first nozzle 60A and second tool path data representing a movement path of the second nozzle 60B when forming layers constituting the three-dimensional shaped article. First ejection amount data representing an amount of ejection of the first material to be ejected from the first nozzle 60A is associated with the first tool path data. Second ejection amount data representing an amount of ejection of the second material to be ejected from the second nozzle 60B is associated with the second tool path data.

Then, in the step S120, the control section 300 controls the first ejection section 100A, the second ejection section 100B, and the drive section 210 in accordance with the modeling data to thereby form a layer having at least one of a product portion which is formed of the modeling material ejected from the first nozzle 60A and a support portion formed of a support material ejected from the second nozzle 60B on the stage 220.

In the step S130, the control section 300 determines whether or not the modeling of all of the layers is completed. It is possible for the control section 300 to determine whether or not the modeling of all of the layers is completed using the modeling data. When it has not been determined that the modeling of all of the layers has been completed in the step S130, the control section 300 returns the process to the step S120 to further model a layer on the layer. When it has been determined in the step S130 that the modeling of all of the layers has been completed, the control section 300 terminates this processing.

Figure 6:
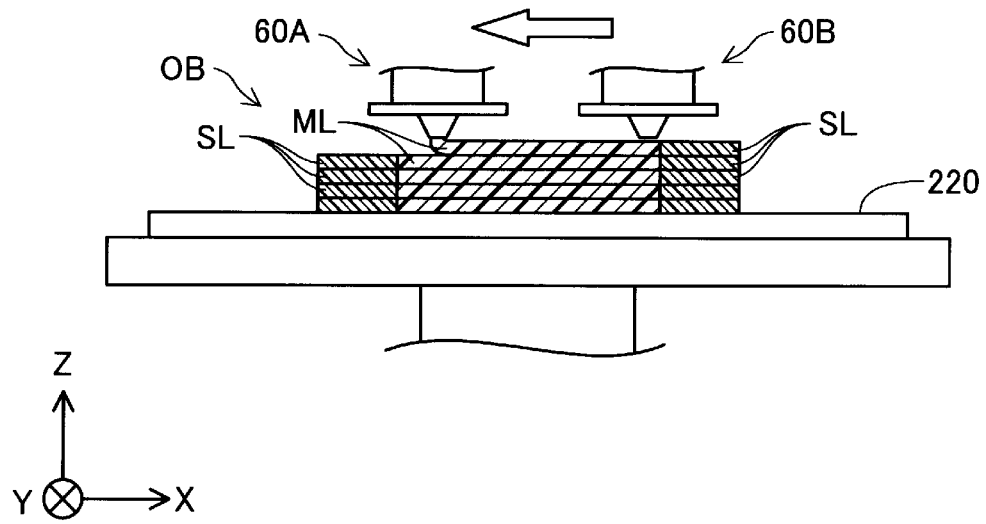
FIG. 6 is a first explanatory diagram showing a process in which a three-dimensional shaped article is shaped.
Figure 7:
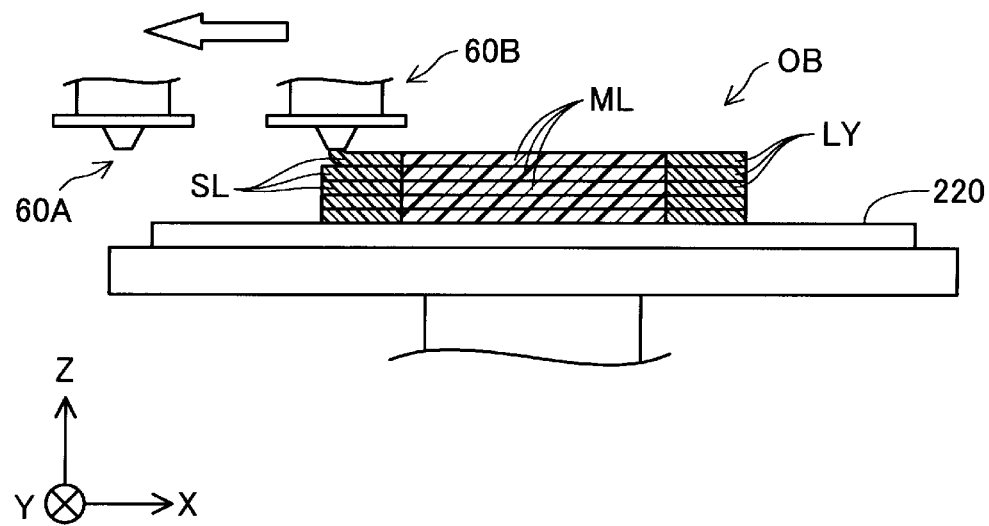
FIG. 7 is a second explanatory diagram showing the process in which the three-dimensional shaped article is shaped.
Figure 8:
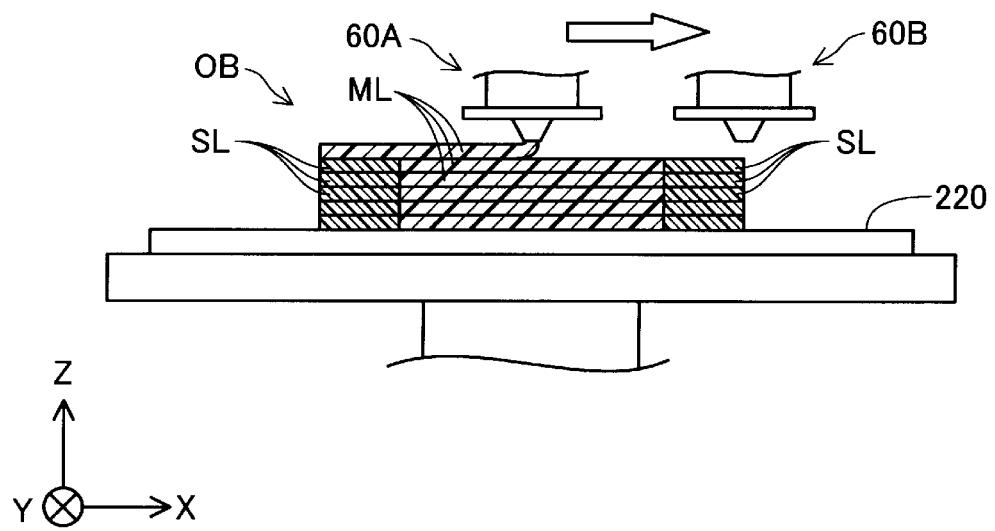
FIG. 8 is a third explanatory diagram showing the process in which the three-dimensional shaped article is shaped.

FIG. 6 is a first explanatory diagram showing a process in which a three-dimensional shaped article OB is shaped. FIG. 7 is a second explanatory diagram showing a process in which the three-dimensional shaped article OB is shaped. FIG. 8 is a third explanatory diagram showing a process in which the three-dimensional shaped article OB is shaped. In FIG. 6 through FIG. 8, there is shown an example of a process in which the three-dimensional shaped article OB is shaped using the three-dimensional modeling process described above.

In the step S120 of the three-dimensional modeling process, the control section 300 controls the second drive section 212 to eject the modeling material from the first nozzle 60A while moving the first nozzle 60A along the first tool path to thereby form a modeling layer ML made of the modeling material as shown in, for example, FIG. 6, and then controls the second drive section 212 to eject the support material from the second nozzle 60B while moving the second nozzle 60B along the second tool path to thereby form a support layer SL made of the support material as shown in FIG. 7. After the step S130, in the step S120, the control section 300 controls once again, for example, the first drive section 211 to move down the stage 220 as much as the thickness of the modeling layer ML, and then, controls the second drive section 212 to eject the modeling material from the first nozzle 60A while moving the first nozzle 60A along the first tool path to thereby further form the modeling layer ML on the support layer SL and the modeling layer ML as shown in FIG. 8.

The control section 300 repeats the step S120 and the step S130 to stack the modeling layers ML and the support layers SL on one another to thereby shape the three-dimensional shaped article OB. After the three-dimensional modeling process is terminated, the product portion formed of the modeling layer ML and the support portion formed of the support layer SL out of the three-dimensional shaped article OB are separated from each other.

The larger the number of times of execution of the three-dimensional modeling process becomes, the higher the degree of deterioration of the first nozzle 60A and the second nozzle 60B becomes. When the degree of deterioration of the first nozzle 60A and the second nozzle 60B reaches a predetermined degree of deterioration, there is a possibility that it becomes unachievable to shape the three-dimensional shaped article OB with high dimensional accuracy, and therefore, the first nozzle 60A and the second nozzle 60B are replaced. When the replacement of the first nozzle 60A and the second nozzle 60B is performed, a relative position of the second nozzle 60B to the first nozzle 60A is displaced in some cases due to an installation error of the first nozzle 60A and the second nozzle 60B or the like. When the relative position of the second nozzle 60B to the first nozzle 60A is displaced, there is a possibility that the modeling layer ML is deformed due to the second nozzle 60B making contact with the modeling layer ML during the three-dimensional modeling process, or a possibility that the modeling layer ML cannot be supported by the support layer SL and is deformed due to the relative position of the support layer SL to the modeling layer ML being displaced. In a method of manufacturing the three-dimensional shaped article OB according to the present embodiment, when at least one of the first nozzle 60A and the second nozzle 60B is replaced, it is possible to adjust the relative position of the second nozzle 60B to the first nozzle 60A by executing a calibration process in advance of the three-dimensional modeling process.

Figure 9:
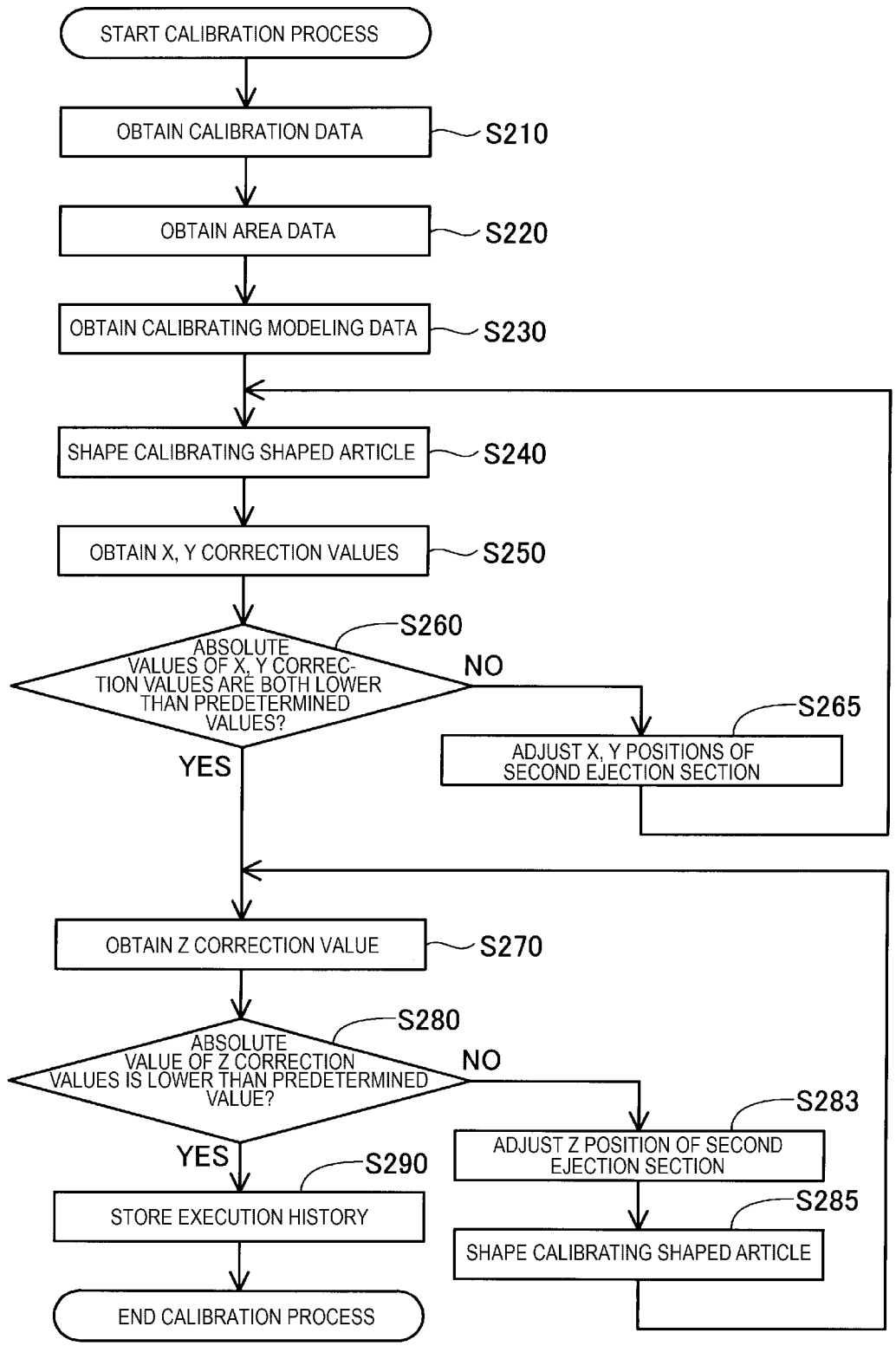
FIG. 9 is a flowchart showing a content of a calibration process in the first embodiment.
Figure 10:
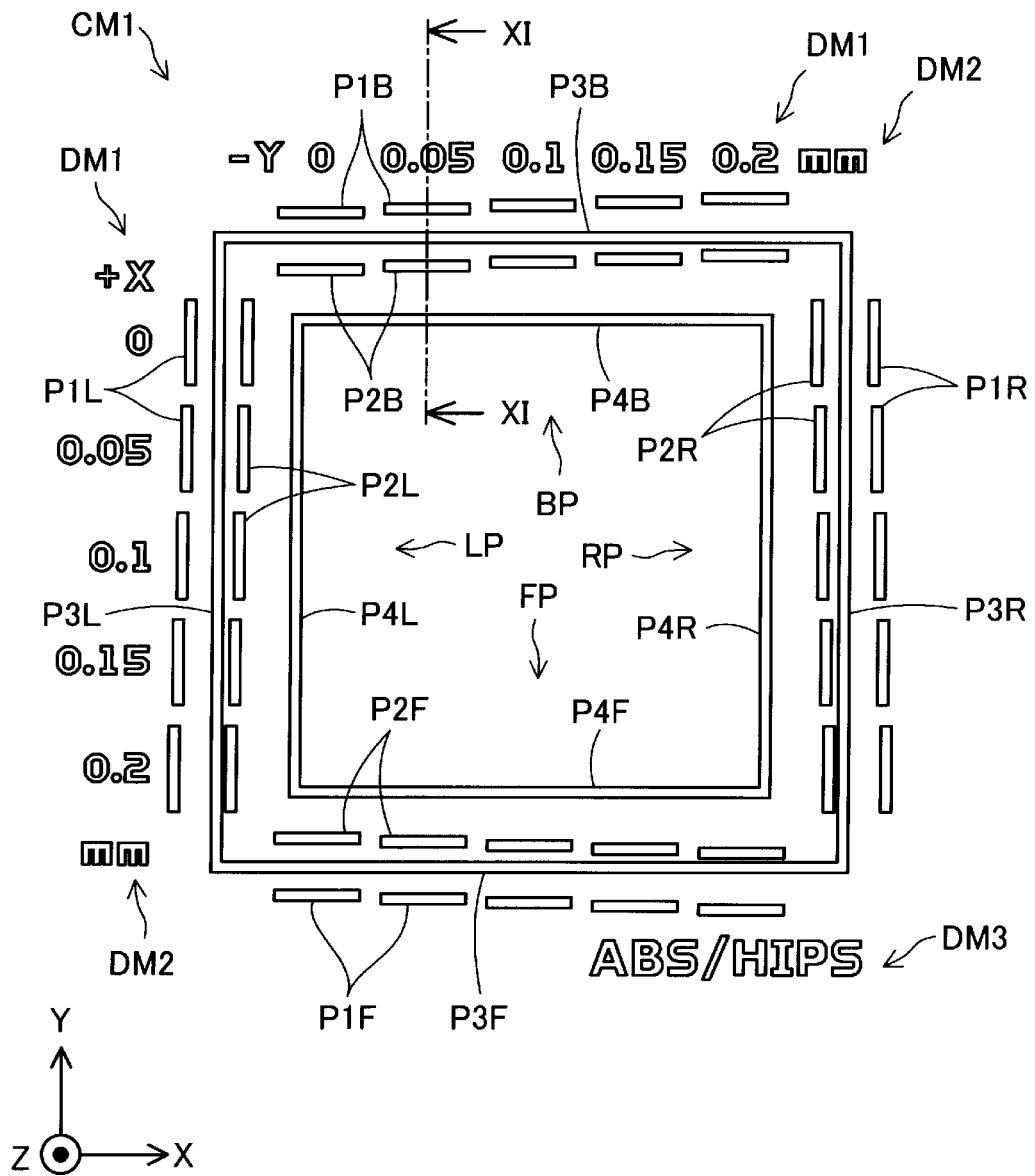
FIG. 10 is a top view showing a calibrating shaped article for a low-temperature material in the first embodiment.
Figure 11:
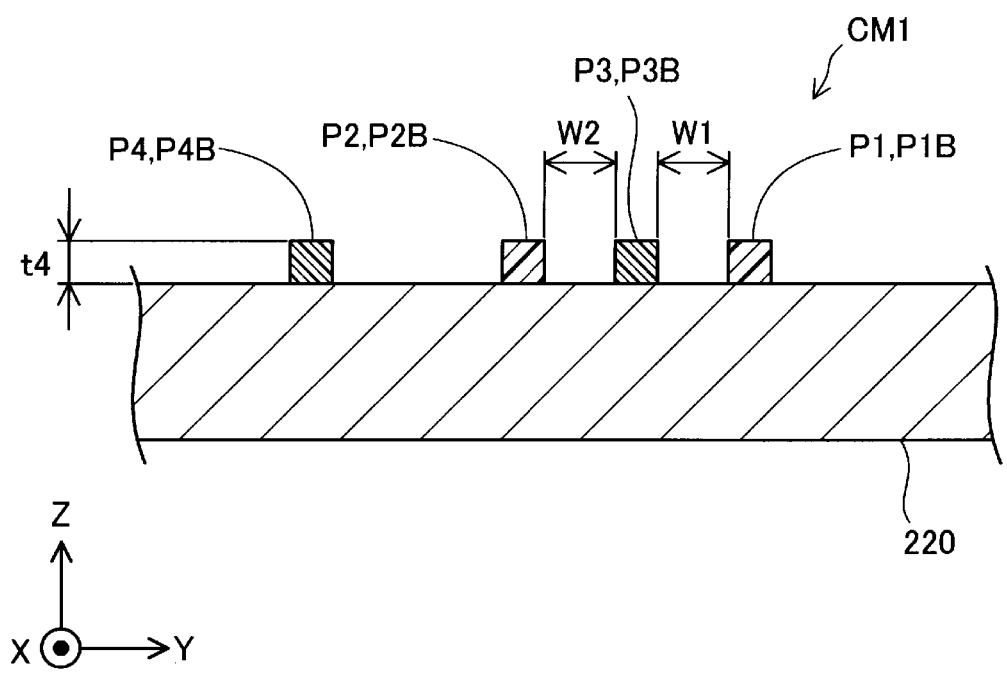
FIG. 11 is a cross-sectional view along the line XI-XI in FIG. 10.
Figure 12:
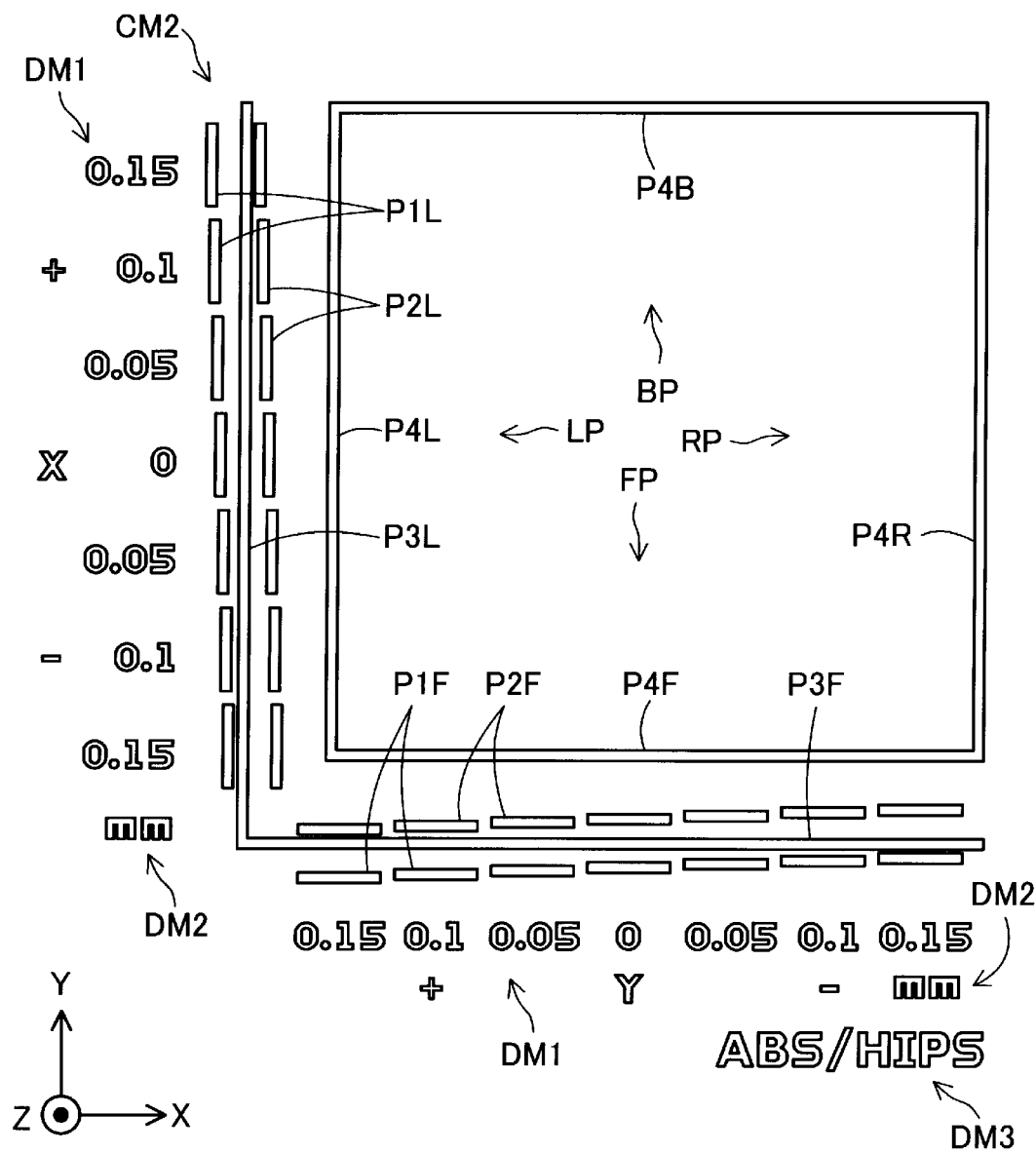
FIG. 12 is a top view showing a calibrating shaped article for a high-temperature material in the first embodiment.

FIG. 9 is a flowchart showing a content of the calibration process in the present embodiment. FIG. 10 is a top view showing a calibrating shaped article CM1 shaped in accordance with calibrating modeling data for a low-temperature material in the calibration process in the present embodiment. FIG. 11 is a cross-sectional view along the line XI-XI in FIG. 10. FIG. 12 is a top view showing a calibrating shaped article CM2 shaped in accordance with calibrating modeling data for a high-temperature material in the calibration process in the present embodiment.

As shown in FIG. 9, the calibration process is started when the control section 300 has received a predetermined operation from the user. The processing is started when, for example, a start button for the calibration process displayed in the operation panel 120 is tapped.

First, in the step S210, the control section 300 reads material data representing a type of the first material to be ejected from the first nozzle 60A, and a type of the second material to be ejected from the second nozzle 60B. In the present embodiment, the material data is stored in advance in the memory of the control section 300. The control section 300 reads the material data from the memory. The type of the first material and the type of the second material are input by the user via, for example, the operation panel 120.

Then, in the step S220, the control section 300 obtains area data representing an area on the stage 220 for shaping the calibrating shaped article CM1 shown in FIG. 10 or the calibrating shaped article CM2 shown in FIG. 12. The calibrating shaped articles CM1, CM2 mean three-dimensional shaped articles to be used for the calibration of the three-dimensional modeling device 11. The calibrating shaped articles CM1, CM2 are referred to as shaped articles for the calibration, or calibration models in some cases. In the present embodiment, an area on the stage 220 for shaping the calibrating shaped articles CM1, CM2 is designated by the user via the operation panel 120. The control section 300 obtains the area data representing the area on the stage 220 designated via the operation panel 120. It should be noted that in another embodiment, it is possible for the control section 300 to shape the calibrating shaped articles CM1, CM2 in an area set in advance on the stage 220 instead of the area designated by the user.

In the step S230, the control section 300 reads the calibrating modeling data for shaping the calibrating shaped articles CM1, CM2. In the present embodiment, the calibrating modeling data for shaping the calibrating shaped article CM1 using the low-temperature material as a material having the melting temperature lower than a predetermined temperature, and the calibrating modeling data for shaping the calibrating shaped article CM2 using the high-temperature material as a material having the melting temperature no lower than the predetermined temperature are stored in advance in the memory of the control section 300. The calibrating modeling data corresponding to the type of the material represented by the material data read in the step S210 is read by the control section 300 from the memory. In the present embodiment, the control section 300 reads the calibrating modeling data for the low-temperature material when shaping the calibrating shaped article CM1 using the modeling material such as ABS resin or PLA. The control section 300 reads the calibrating modeling data for the high-temperature material when shaping the calibrating shaped article CM2 using, for example, the modeling material obtained by combining polyetherimide (PEI) or nylon 12 with carbon fibers.

In the step S240, the control section 300 controls the first ejection section 100A, the second ejection section 100B, and the drive section 210 in accordance with the calibrating modeling data read in the step S230 to thereby shape the calibrating modeling articles CM1, CM2 in the area on the stage 220 represented by the area data.

As shown in FIG. 10, the calibrating shaped article CM1 shaped in accordance with the calibrating modeling data for the low-temperature material is configured so as to have a frame-like quadrangular shape in a top view. The calibrating shaped article CM1 has a left portion LP corresponding to a left side of the quadrangular shape, a right portion RP corresponding to a right side of the quadrangular shape, a front portion FP corresponding to a bottom side of the quadrangular shape, and a back portion BP corresponding to a top side of the quadrangular shape.

In the present embodiment, the left portion LP, the right portion RP, the front portion FP, and the back portion BP each have five first portions P1, five second portions P2, a single third portion P3, and a single fourth portion P4. It should be noted that the number of the first portions P1 provided to each of the portions LP, RP, FP, and BP is not limited to five, and is only required to, for example, no smaller than two. The number of the second portions P2 provided to each of the portions LP, RP, FP, and BP is not limited to five, and is only required to, for example, no smaller than two. It is preferable for the number of the first portions P1 and the number of the second portions P2 to be the same as each other.

In the following descriptions, a term of "left," "right," "front," or "back" is attached at the head of the name of each of the terms of first portion P1, second portion P2, third portion P3, and fourth portion P4, and a character of "L," "R," "F," or "B" is attached at the tail of the reference symbol thereof in some cases. For example, the first portion P1 provided to the left portion LP is referred to as a left first portion P1L in some cases, the first portion P1 provided to the right portion RP is referred to as a right first portion P1R in some cases, the second portion P2 provided to the front portion FP is referred to as a front second portion P2F in some cases, and the second portion P2 provided to the back portion BP is referred to as a back second portion P2B in some cases.

As described above, the left portion LP has the five left first portions P1L, the five left second portions P2L, and the single left third portion P3L, and the single left fourth portion P4L. The five left first portions P1L are arranged side by side along the Y axis. Each of the left first portions P1L is configured to be shaped like a straight line parallel to the Y axis. In the present embodiment, each of the left first portions P1L is formed of a single first material ejected in the form of a line from the first nozzle 60A. The left first portions P1L are the same in length as each other. The left first portions P1L are arranged so that the further the left first portion P1L is shifted toward the −Y direction, the further that left first portion P1L is shifted toward the −X direction. The positions in the X axis of the left first portions P1L adjacent to each other are different from each other as much as a predetermined distance. In the present embodiment, the positions in the X axis of the left first portions P1L adjacent to each other are different from each other as much as 0.05 millimeter. It should be noted that in another embodiment, the left first portions P1L can be arranged so that the further the left first portion P1L is shifted toward the −Y direction, the further that left first portion P1L is shifted toward the +X direction. In the present embodiment, the positions in the X axis of the left first portions P1L adjacent to each other can be different from each other as much as, for example, 0.10 millimeter instead of 0.05 millimeter.

The five left second portions P2L are arranged side by side along the Y axis. Each of the left second portions P2L is arranged at the +X direction side with respect to corresponding one of the left first portions P1L. The left second portions P2L are configured to be shaped like straight lines parallel to the Y axis, in other words, parallel to the respective left first portions P1L. In the present embodiment, each of the left second portions P2L is formed of a single first material ejected in the form of a line from the first nozzle 60A. The left second portions P2L are the same in length as the respective left first portions P1L. The five left second portions P2L are each arranged at a predetermined distance from the left first portion P1L the same in position in the Y axis as that left second portion P2L. Distances between the five left second portions P2L from the corresponding left first portions P1L the same in position in the Y axis as the five left second portions P2L are the same as each other. For example, the left second portion P2L disposed at the farthest to the +Y direction side is disposed at a predetermined distance from the left first portion P1L disposed at the farthest to the +Y direction side. The left second portion P2L disposed at the second farthest to the +Y direction side is disposed at a predetermined distance from the left first portion P1L disposed at the second farthest to the +Y direction side, and the predetermined distance is the same as the distance between the left second portion P2L disposed at the farthest to the +Y direction side and the left first portion P1L disposed at the farthest to the +Y direction side.

The left third portion P3L is disposed between the left first portions P1L and the left second portions P2L. The left third portion P3L is configured to be shaped like a straight line parallel to the Y axis. In the present embodiment, the left third portion P3L is formed of a single second material ejected in the form of a line from the second nozzle 60B. The length of the left third portion P3L is longer than the length of the left first portion P1L, and the length of the left second portion P2L. An end portion at the +Y direction side of the left third portion P3L is disposed at the +Y direction side with respect to an end portion at the +Y direction side of the left first portion P1L disposed at the farthest to the +Y direction side out of the five left first portions P1L. An end portion at the −Y direction side of the left third portion P3L is disposed at the −Y direction side with respect to an end portion at the −Y direction side of the left first portion P1L disposed at the farthest to the −Y direction side out of the five left first portions P1L.

The left fourth portion P4L is arranged at the +X direction side with respect to the left second portions P2L. The left fourth portion P4L is configured to be shaped like a straight line parallel to the Y axis. In the present embodiment, the left fourth portion P4L is formed of a single second material ejected in the form of a line from the second nozzle 60B.

As described above, the right portion RP has the right first portions P1R, the right second portions P2R, the right third portion P3R, and the right fourth portion P4R. The right portion RP is configured so as to be bilaterally symmetric with the left portion LP. In other words, the right first portions P1R are arranged so that the farther the right first portion P1R is shifted toward the −Y direction side, the farther that right first portion P1R is shifted toward the +X direction side, and the right second portions P2R are arranged so that the farther the right second portion P2R is shifted toward the −Y direction side, the farther that right second portion P2R is shifted toward the +X direction side. The right third portion P3R is disposed between the right first portions P1R and the right second portions P2R. The right fourth portion P4R is arranged at the −X direction side with respect to the right second portions P2R.

As described above, the front portion FP has the five front first portions P1F, the five front second portions P2F, and the single front third portion P3F, and the single front fourth portion P4F. The front portion FP has substantially the same configuration as the configuration of the left portion LP which is rotated counterclockwise as much as 90 degrees when viewed downward from above. In other words, the front first portions P1F, the front second portions P2F, the front third portion P3F, and the front fourth portion P4F are arranged in parallel to the X axis. The front first portions P1F are arranged so that the farther the front first portion P1F is shifted toward the +X direction side, the farther that front first portion P1F is shifted toward the −Y direction side, and the front second portions P2F are arranged so that the farther the front second portion P2F is shifted toward the +X direction side, the farther that front second portion P2F is shifted toward the −Y direction side. The front third portion P3F is disposed between the front first portions P1F and the front second portions P2F. The front fourth portion P4F is arranged at the +Y direction side with respect to the front second portions P2F.

The back portion BP has the back first portions P1B, the back second portions P2B, the back third portion P3B, and the back fourth portion P4B. The back portion BP is configured so as to be longitudinally symmetric with the front portion FP. In other words, the back first portions P1B are arranged so that the farther the back first portion P1B is shifted toward the +X direction side, the farther that back first portion P1B is shifted toward the +Y direction side, and the back second portions P2B are arranged so that the farther the back second portion P2B is shifted toward the +X direction side, the farther that back second portion P2B is shifted toward the +Y direction side. The back third portion P3B is disposed between the back first portions P1B and the back second portions P2B. The back fourth portion P4B is arranged at the −Y direction side with respect to the back second portions P2B.

In the present embodiment, by the end portions of the third portions P3L, P3R, P3F, and P3B being coupled to each other, the four third portions P3L, P3R, P3F, and P3B are formed to have a square frame-like shape. By the end portions of the fourth portions P4L, P4R, P4F, and P4B being coupled to each other, the four fourth portions P4L, P4R, P4F, and P4B are formed to have a square frame-like shape.

As shown in FIG. 11, in the present embodiment, the first portions P1, the second portions P2, the third portions P3, and the fourth portions P4 are each formed of a single layer. In the following description, a distance between the first portion P1 and the third portion P3 arranged side by side are referred to as a first distance W1, and a distance between the second portion P2 and the third portion P3 arranged side by side is referred to as a second distance W2. In the present embodiment, the second tool path for shaping the third portion P3 is disposed at the midpoint between the first tool path for shaping the first portion P1 and the first tool path for shaping the second portion P2 at the position of the left first portion P1L disposed at the farthest to the +Y direction side, the position of the right first portion P1R disposed at the farthest to the +Y direction side, the position of the front first portion P1F disposed at the farthest to the −X direction side, and the position of the back first portion P1B disposed at the farthest to the −X direction side. Therefore, when no displacement occurs in the relative position between the nozzles 60A, 60B, the first distances W1 and the second distances W2 become equal to each other at each of the positions described above.

As shown in FIG. 10, in the present embodiment, in an area on the stage 220 represented by the area data, there are shaped offset amount displaying shaped articles DM1, unit displaying shaped articles DM2, and a material displaying shaped article DM3 together with the calibrating shaped article CM1.

The offset amount displaying shaped articles DM1 are arranged adjacent to the first portions P1, respectively. The shapes of the offset amount displaying shaped articles DM1 represent absolute values of offset amounts of the first portions P1 disposed adjacent to the offset amount displaying shaped articles DM1, respectively. The offset amount of the first portion P1 means a shift amount of the first portion P1 from a reference position.

In the example shown in FIG. 10, the offset amount displaying shaped articles DM1 are arranged at the positions adjacent to the left first portions P1L, and the positions adjacent to the back first portions P1B, respectively. The offset amount displaying shaped articles DM1 arranged adjacent to the left first portions P1L represent the offset amounts of the left first portions P1L in the X axis, respectively, taking the position of the left first portion P1L disposed at the farthest to the +Y direction side as a reference position. The offset amounts of the left first portions P1L in the X axis correspond to a variation in position of the first nozzle 60A in the X axis when shaping the respective left first portions P1L. The offset amount displaying shaped articles DM1 arranged adjacent to the left first portions P1L respectively represent numerals of "0," "0.05," "0.1," "0.15," and "0.2" in this order from the +Y direction side.

The offset amount displaying shaped articles DM1 arranged adjacent to the back first portions P1B represent the offset amounts of the back first portions P1B in the Y axis, respectively, taking the position of the back first portion P1B disposed at the farthest to the −X direction side as a reference position. The offset amounts of the back first portions P1B in the Y axis correspond to a variation in position of the first nozzle 60A in the Y axis when shaping the respective back first portions P1B. The offset amount displaying shaped articles DM1 arranged adjacent to the back first portions P1B respectively represent numerals of "0," "0.05," "0.1," "0.15," and "0.2" in this order from the −X direction side.

In the present embodiment, the three-dimensional modeling device 11 has a metric system mode of representing a length in the metric system, and an Imperial system mode of representing a length in the Imperial system as operation modes. In the metric system mode, the offset amounts represented by the offset amount displaying shaped articles DM1 are represented in the metric system, and in the Imperial system mode, the offset amounts represented by the offset amount displaying shaped articles DM1 are represented in the Imperial system.

The unit displaying shaped articles DM2 are each arranged in the vicinity of the offset amount displaying shaped article DM1. The shape of the unit displaying shaped article DM2 represents the unit of the offset amount, namely the unit of a value represented by the offset amount displaying shaped article DM1. In the example shown in FIG. 10, the shape of the unit displaying shaped article DM2 represents characters of "mm." The characters of "mm" represent the fact that the unit of the values represented by the offset amount displaying shaped articles DM1 is millimeter. In the metric system mode, the unit represented by the unit displaying shaped article DM2 is represented in the metric system, and in the Imperial system mode, the unit represented by the unit displaying shaped article DM2 is represented in the Imperial system.

The shape of the material displaying shaped article DM3 represents the type of the first material and the type of the second material. In the example shown in FIG. 10, the shape of the material displaying shaped article DM3 represents characters of "ABS/HIPS." The characters of "ABS/HIPS" represent the fact that the type of the first material is ABS resin, and the type of the second material is HIPS.

In the present embodiment, the offset amount displaying shaped articles DM1, the unit displaying shaped articles DM2, and the material displaying shaped article DM3 are formed of the first material. It should be noted that in another embodiment, at least one of the offset amount displaying shaped articles DM1, the unit displaying shaped articles DM2, and the material displaying shaped article DM3 can be formed of the second material.

FIG. 12 is a top view showing the calibrating shaped article CM2 shaped in accordance with the calibrating modeling data for the high-temperature material. The shape of the calibrating shaped article CM2 shaped in accordance with the calibrating modeling data for the high-temperature material is different from the shape of the calibrating shaped article CM1 shaped in accordance with the calibrating modeling data for the low-temperature material shown in FIG. 10. Specifically, the calibrating shaped article CM2 shaped in accordance with the calibrating modeling data for the high-temperature material is different from the calibrating shaped article CM1 shaped in accordance with the calibrating modeling data for the low-temperature material in the point that the right first portions P1R, the right second portions P2R, the right third portion P3R, the back first portions P1B, the back second portions P2B, and the back third portion P3B are not provided.

In the present embodiment, the size of the calibrating shaped article CM2 shaped in accordance with the calibrating modeling data for the high-temperature material is larger than the size of the calibrating shaped article CM1 shaped in accordance with the calibrating modeling data for the low-temperature material. Specifically, the length along the X axis and the length along the Y axis of the calibrating shaped article CM2 shaped in accordance with the calibrating modeling data for the high-temperature material are longer than the length along the X axis and the length along the Y axis of the calibrating shaped article CM1 shaped in accordance with the calibrating modeling data for the low-temperature material, respectively.

In the present embodiment, in the step S240 shown in FIG. 9, the control section 300 shapes the calibrating shaped articles CM1, CM2, and then, shapes the offset amount displaying shaped articles DM1, the unit displaying shaped articles DM2, and the material displaying shaped article DM3 in this order. It should be noted that the order in which the calibrating shaped articles CM1, the offset amount displaying shaped articles DM1, the unit displaying shaped article DM2, and the material displaying shaped article DM3 are shaped is not limited to the order described above, and any orders can be adopted. For example, it is possible to shape the calibrating shaped articles CM1, CM2 after the offset amount displaying shaped articles DM1, the unit displaying shaped articles DM2, and the material displaying shaped article DM3 are shaped in this order. It is possible for the control section 300 not to shape at least one of the offset amount displaying articles DM1, the unit displaying shaped articles DM2, and the material displaying shaped article DM3 in the calibration process.

In the present embodiment, when shaping the calibrating shaped articles CM1, CM2, the control section 300 ejects the first material from the first nozzle 60A while moving the first ejection section 100A and the second ejection section 100B using the second drive section 212 to thereby shape the first portions P1 and the second portions P2 on the stage 220 in this order, and then, ejects the second material from the second nozzle 60B while moving the first ejection section 100A and the second ejection section 100B using the second drive section 212 to thereby shape the third portions P3 and the fourth portions P4 on the stage 220 in this order. The control section 300 makes positions of the first nozzle 60A in the X axis when shaping the left first portions P1L, the left second portions P2L, the right first portions P1R, and the right second portions P2R different from each other using the second drive section 212 to thereby make the positions of the left first portions P1L, the left second portions P2L, the right first portions P1R, and the right second portions P2R in the X axis different from each other. The control section 300 makes positions of the first nozzle 60A in the Y axis when shaping the front first portions P1F, the front second portions P2F, the back first portions P1B, and the back second portions P2B different from each other using the second drive section 212 to thereby make the positions of the front first portions P1F, the front second portions P2F, the back first portions P1B, and the back second portions P2B in the Y axis different from each other. It should be noted that the order in which the first portions P1, the second portions P2, the third portions P3, and the fourth portions P4 are shaped is not limited to the order described above, and any orders can be adopted. For example, it is possible for the control section 300 to shape the fourth portions P4 after shaping the third portions P3, and further shape the first portions P1 and the second portions P2. Ejecting the first material from the first nozzle 60A to thereby shape the first portions P1 and the second portions P2 is referred to as a first process, a first step of a calibration method of the three-dimensional modeling device 11, or a first step of a calibration step in some cases, and ejecting the second material from the second nozzle 60B to thereby shape the third portions P3 is referred to as a second process, a second step of the calibration method of the three-dimensional modeling device 11, or a second step of the calibration step in some cases.

As shown in FIG. 9, in the step S250, the control section 300 obtains an X correction value and a Y correction value. In the present embodiment, the X correction value and the Y correction value are input by the user to the operation panel 120. It is possible to input the X correction value and the Y correction value to the operation panel 120 in terms of 0.05 millimeter (0.002 inch). The control section 300 obtains the X correction value and the Y correction value input to the operation panel 120. In the present embodiment, first, the user observes the calibrating shaped articles CM1, CM2 with, for example, a magnifying glass to thereby identify a position where an absolute value of a difference between the first distance W1 and the second distance W2 in the X axis is the smallest, and a position where an absolute value of a difference between the first distance W1 and the second distance W2 in the Y axis is the smallest. Then, the user refers to the offset amounts represented by the offset amount displaying shaped articles DM1 to figure out the offset amount of the first portion P1 in the X axis at the position where the absolute value of the difference between the first distance W1 and the second distance W2 in the X axis is the smallest, and the offset amount of the first portion P1 in the Y axis at the position where the absolute value of the difference between the first distance W1 and the second distance W2 in the Y axis is the smallest. Subsequently, the user inputs a value obtained by multiplying the offset amount of the first portion P1 in the X axis at the position thus identified by "−1" to the operation panel 120 as the X correction value, and inputs a value obtained by multiplying the offset amount of the first portion P1 in the Y axis by "−1" to the operation panel 120 as the Y correction value.

In the example shown in FIG. 10, the position where the absolute value of the difference between the first distance W1 and the second distance W2 is the smallest in the X axis is the position of the left first portion P1L at the farthest to the +Y direction side out of the five left first portions P1L. Since a value obtained by multiplying the offset amount of the first portion P1 in the X axis at the position of the left first portion P1L at the farthest to the +Y direction side by "−1" is 0.00 millimeter, the user inputs 0.00 millimeter as the X correction value. The position where the absolute value of the difference between the first distance W1 and the second distance W2 is the smallest in the Y axis is the position of the back first portion P1B at the second farthest to the −X direction side out of the five back first portions P1B. Since a value obtained by multiplying the offset amount of the first portion P1 in the Y axis at the position of the back first portion P1B at the second farthest to the −X direction side by "−1" is −0.05 millimeter, the user inputs −0.05 millimeter as the Y correction value.

In the step S260, the control section 300 determines whether or not the absolute value of the X correction value is lower than a predetermined value, and the absolute value of the Y correction value is lower than a predetermined value. In the present embodiment, the control section 300 determines whether or not the absolute value of the X correction value is lower than 0.05 millimeter (0.002 inch), and at the same time, the absolute value of the Y correction value is lower than 0.05 millimeter (0.002 inch).

When it has not been determined in the step S260 that the absolute value of the X correction value is lower than the predetermined value, and at the same time, the absolute value of the Y correction value is lower than the predetermined value, the control section 300 adjusts the relative position of the second nozzle 60B with respect to the first nozzle 60A in the X axis and the Y axis in accordance with the X correction value and the Y correction value in the step S265. In the present embodiment, the control section 300 controls the third drive section 213 to move the second ejection section 100B as much as the distance represented by the X correction value in parallel to the X axis to thereby adjust the relative position between the nozzles 60A, 60B in the X axis. The control section 300 controls the third drive section 213 to move the second ejection section 100B as much as the distance represented by the Y correction value in parallel to the Y axis to thereby adjust the relative position between the nozzles 60A, 60B in the Y axis. For example, when the X correction value is 0.00 millimeter, and the Y correction value is −0.05 millimeter, the control section 300 moves the second ejection section 100B as much as 0.05 millimeter toward the −Y direction in parallel to the Y axis without moving the second ejection section 100B in parallel to the X axis. It should be noted that adjusting the relative position of the second nozzle 60B to the first nozzle 60A in accordance with the X correction value and the Y correction value is referred to as a third process, a third step of the calibration method of the three-dimensional modeling device 11, or a third step of the calibration step in some cases.

When adjusting the relative position between the nozzles 60A, 60B in the X axis and the Y axis in the step S265, the control section 300 returns the process to the step S240 to shape the calibrating shaped articles CM1, CM2 in accordance with the calibrating modeling data once again in order to confirm the adjustment condition of the relative position between the nozzles 60A, 60B in the X axis and the Y axis. The control section 300 repeats the processing in the step S265 and the processing from the step S240 to the step S260 until it is determined in the step S260 that the absolute value of the X correction value is lower than the predetermined value and at the same time the absolute value of the Y correction value is lower than the predetermined value. It should be noted that it is preferable for the calibrating shaped articles CM1, CM2 shaped before the processing in the step S265 to be removed by the user on the stage 220 in advance of the processing in the step S265.

When it has been determined in the step S260 that the absolute value of the X correction value is lower than the predetermined value, and at the same time the absolute value of the Y correction value is lower than the predetermined value, the control section 300 obtains a Z correction value in the step S270. In the present embodiment, the Z correction value is input by the user to the operation panel 120. The control section 300 obtains the Z correction value input to the operation panel 120. The user measures a thickness t4 of the fourth portion P4 of each of the calibrating shaped articles CM1, CM2 using, for example, a vernier caliper, and then inputs the measurement value of the thickness t4 of the fourth portion P4 to the operation panel 120 as the Z correction value. In the present embodiment, the Z correction value can be input in terms of 0.01 millimeter (0.0005 inch).

In the step S280, the control section 300 determines whether or not the absolute value of the Z correction value is lower than a predetermined value. In the present embodiment, the control section 300 determines whether or not the absolute value of the Z correction value is lower than 0.01 millimeter (0.0005 inch).

When it has not been determined in the step S280 that the absolute value of the Z correction value is lower than the predetermined value, the control section 300 adjusts the position of the second ejection section 100B with respect to the stage 220 when ejecting the second material from the second nozzle 60B in the step S283 so that the distance between the stage 220 and the tip portion of the first nozzle 60A when ejecting the first material from the first nozzle 60A and the thickness t4 of the fourth portion P4 becomes equal to each other. In the present embodiment, the control section 300 moves the second ejection section 100B along the Z axis using the third drive section 213 to thereby adjust the position of the second ejection section 100B to the stage 220 when ejecting the second material from the second nozzle 60B. It should be noted that in another embodiment, it is possible for the control section 300 to make the position of the stage 220 in the Z axis different using the first drive section 211 between when ejecting the first material from the first nozzle 60A and when ejecting the second material from the second nozzle 60B to thereby adjust the position of the second ejection section 100B to the stage 220 when ejecting the second material from the second nozzle 60B.

When it has been determined in the step S280 that the absolute value of the Z correction value is lower than the predetermined value, the control section 300 stores execution history data of the calibration process in the memory in the step S290. The execution history data of the calibration process includes time and data when the calibration process has been executed, the type of the first material represented by the material data, the type of the second material represented by the material data, the X correction value, the Y correction value, and the Z correction value. When the processing in the step S265 has been executed a plurality of times, the X correction value represented by the execution history data is represented as an accumulated value of the X correction values obtained a plurality of times in the step S250, and the Y correction value represented by the execution history data is represented as an accumulated value of the Y correction values obtained a plurality of times in the step S250. Subsequently, the control section 300 terminates this process.

FIG. 13 is an explanatory diagram showing an operation history display screen SC to be displayed on the operation panel 120. The operation history display screen SC is displayed on the operation panel 120 by the control section 300 when, for example, the user performs a predetermined operation to the operation panel 120. In the operation history display screen SC, there are disposed fields of "OPERATION CONTENT," "TIME AND DATE," "MATERIAL," "X CORRECTION VALUE," "Y CORRECTION VALUE," and "Z CORRECTION VALUE" in this order from the left side. In the field of "OPERATION CONTENT," there is displayed the operation content having been performed on the three-dimensional modeling device 11 such as the calibration process, a nozzle replacement operation of replacing the nozzles 60A, 60B, a stage replacement operation of replacing the stage 220, or a material replacement operation of replacing the material. In the field of "TIME AND DATE," there is displayed the time and the date when the operation has been performed. In the field of "MATERIAL," there is displayed the type of the material which has been housed in the material housing section 20 when the operation has been performed. When the material replacement operation has been performed, the type of the material after the replacement is displayed in the field of "MATERIAL." In the field of "X CORRECTION VALUE," the field of "Y CORRECTION VALUE," and the field of "Z CORRECTION VALUE," there are displayed the X correction value, the Y correction value, and the Z correction value represented by the execution history data in the calibration process. The control section 300 automatically obtains information which can automatically be obtained out of information to be displayed in the operation history display screen SC, and displays a screen for prompting the user to input information which cannot automatically be obtained on the operation panel 120, and then obtain the information input by the user.

In the operation history display screen SC, there can be displayed information related to a nozzle replacement operation, and information related to a stage replacement operation besides the information described above. For example, when the nozzle replacement operation has been executed, it is possible to display the types of the nozzles 60A, 60B after the replacement. When the stage replacement operation has been executed, it is possible to display the type of the stage 220 after the replacement.

In the present embodiment, when the correction values represented in the execution history data of the latest calibration process are different as much as values no smaller than predetermined values from the correction values represented in the execution history data in the previous calibration process, the control section 300 displays a warning message on the operation panel 120. It should be noted that in another embodiment, when the correction values represented in the execution history data of the latest calibration process are different as much as values no smaller than predetermined values from the average values of the correction values represented in the execution history data of the calibration processes executed within a predetermined period, the control section 300 can display a warning message on the operation panel 120.

According to the three-dimensional modeling device 11 of the present embodiment described hereinabove, the control section 300 shapes the calibrating shaped articles CM1, CM2 in the calibration process. It is possible for the user to figure out the presence or absence of the displacement in the relative position between the nozzles 60A, 60B in the X axis and the Y axis, and the X correction value and the Y correction value for adjusting the relative position between the nozzles 60A, 60B using the calibrating shaped articles CM1, CM2. The control section 300 adjusts the relative position between the nozzles 60A, 60B in accordance with the X correction value and the Y correction value input by the user to reduce the displacement described above. Therefore, even when there occurs the displacement in the relative position between the nozzles 60A, 60B, by executing the calibration process in advance of the three-dimensional modeling process, it is possible to prevent the second nozzle 60B from making contact with the modeling layer ML to deform the modeling layer ML, and the relative position of the support layer SL to the modeling layer ML from being displaced to deform the modeling layer ML. Therefore, it is possible to shape the three-dimensional shaped article OB with high dimensional accuracy.

Further, in the present embodiment, the control section 300 shapes the calibrating shaped articles CM1, CM2 in an area on the stage 220 designated by the user. Therefore, it is possible to shape the calibrating shaped articles CM1, CM2 at the positions desired by the user. For example, it is possible to shape the calibrating shaped articles CM1, CM2 at positions where the calibrating shaped articles CM1, CM2 arranged on the stage 220 facilitate the operation of identifying the position where the first distance W1 and the second distance W2 are equal to each other, or positions where the calibrating shaped articles CM1, CM2 are easily taken out from the modeling space 111.

Further, in the present embodiment, the control section 300 shapes the calibrating shaped articles CM1, CM2 with which it is possible to figure out the X correction value and the Y correction value to be input to the operation panel 120 by identifying the position where the first distance W1 and the second distance W2 are equal to each other. Therefore, it is possible for the user to easily figure out the X correction value and the Y correction value which should be input to the operation panel 120.

Further, in the present embodiment, the control section 300 shapes the offset amount displaying shaped articles DM1 representing the absolute values of the offset amounts of the first portions P1 at the positions adjacent to the first portions P1, respectively. In the present embodiment, since the value obtained by multiplying the offset amount of the first portion P1 by "−1" is the correction value, due to the offset amount displaying shaped articles DM1, it is possible to make it easy to make the user recognize the X correction value and the Y correction value which should be input to the operation panel 120.

Further, in the present embodiment, the control section 300 shapes the unit displaying shaped articles DM2 representing the unit of the offset amount together with the calibrating shaped articles CM1, CM2, and can therefore prevent an inputting error of the correction values caused by a false recognition of the unit from occurring.

Further, in the present embodiment, the control section 300 shapes the material displaying shaped article DM3 representing the type of the first material and the type of the second material together with the calibrating shaped articles CM1, CM2, and can therefore make it easy to make the user recognize the type of the first material and the type of the second material.

Further, in the present embodiment, the control section 300 shapes the calibrating shaped article CM1 shaped using the low-temperature material and the calibrating shaped article CM2 shaped using the high-temperature material so as to have respective shapes different from each other. Therefore, since it is possible to shape the calibrating shaped articles CM1, CM2 having the shapes corresponding to the types of the materials, it is possible to prevent the deformation of the calibrating shaped articles CM1, CM2 due to the shrinkage when the materials cool to shrink. In particular, in the present embodiment, the size of the calibrating shaped article CM2 shaped in accordance with the calibrating modeling data for the high-temperature material is larger than the size of the calibrating shaped article CM1 shaped in accordance with the calibrating modeling data for the low-temperature material. Therefore, the calibrating shaped article CM2 which is shaped using the high-temperature material large in shrinkage when the material cools to shrink compared to the low-temperature material can be prevented from deforming.

Further, in the present embodiment, the control section 300 adjusts the position of the second nozzle 60B with respect to the stage 220 so that the distance between the stage 220 and the first nozzle 60A when ejecting the first material from the first nozzle 60A, and the thickness t4 of the fourth portion P4 becomes equal to each other. Therefore, it is possible to decrease the difference in thickness between the layer to be formed of the first material ejected from the first nozzle 60A and the layer to be formed of the second material ejected from the second nozzle 60B to thereby shape the three-dimensional shaped article with high dimensional accuracy.

Further, in the present embodiment, the control section 300 stores the execution history data of the calibration process, and displays the information represented in the execution history data of the calibration process on the operation history display screen SC. Therefore, when an abnormality occurs in the three-dimensional modeling device 11, it is possible for the user to confirm whether or not the calibration process has been performed appropriately by referring to the operation history display screen SC, and therefore, it is possible to make it easy to take a countermeasure against the abnormality of the three-dimensional modeling device 11. In particular, in the present embodiment, when the correction values represented in the execution history data of the latest calibration process are different as much as values no smaller than predetermined values from the correction values represented in the execution history data in the previous calibration process, the control section 300 displays a warning message on the operation panel 120, and therefore, when an operating error occurs, it is possible to make it easy to become aware of the operating error.

B. Second Embodiment

Figure 14:
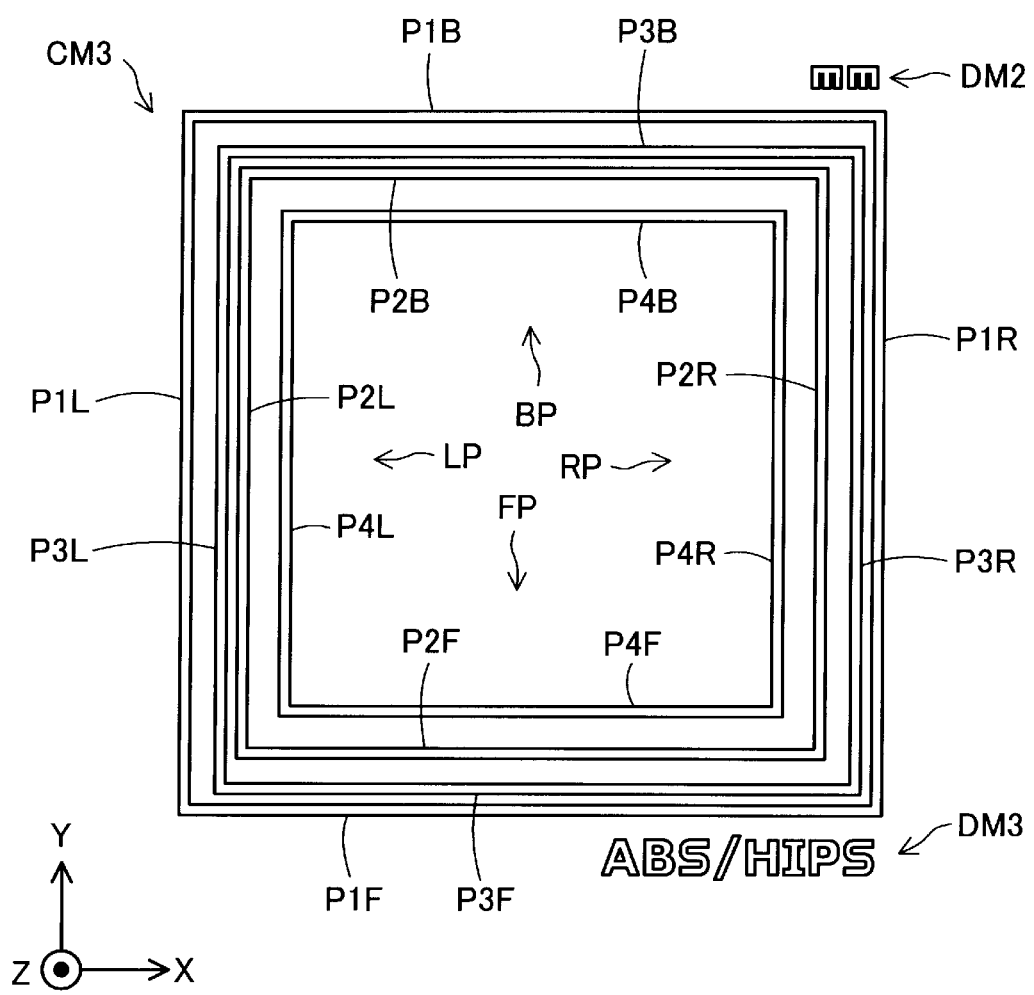
FIG. 14 is a top view showing a calibrating shaped article for a low-temperature material in a second embodiment.

FIG. 14 is a top view showing a configuration of a calibrating shaped article CM3 to be shaped by a three-dimensional modeling process in a second embodiment. In a three-dimensional modeling device 12 according to the second embodiment, a shape of the calibrating shaped article CM3 to be shaped by the calibration process to be executed by the control section 300 is different from that in the first embodiment. The configuration of the three-dimensional modeling device 12, the content of the three-dimensional modeling process, and the content of the calibration process are the same as in the first embodiment unless particularly described.

FIG. 14 shows the calibrating shaped article CM3 shaped in accordance with the calibrating modeling data for the low-temperature material. In the present embodiment, the left first portion P1L, the left second portion P2L, the right first portion P1R, and the right second portion P2R of the calibrating shaped article CM3 are each configured to be shaped like a single continuous straight line parallel to the Y axis. The front first portion P1F, the front second portion P2F, the back first portion P1B, and the back second portion P2B of the calibrating shaped article CM3 are each configured to be shaped like a single continuous straight line parallel to the X axis. The end portions of the first portions P1L, P1R, P1F, and P1B are coupled to each other, and the four first portions P1L, P1R, P1F, and P1B are formed to have a square frame-like shape. The end portions of the second portions P2L, P2R, P2F, and P2B are coupled to each other, and the four second portions P2L, P2R, P2F, and P2B are formed to have a square frame-like shape. Although the illustration is omitted, in the present embodiment, regarding the calibrating shaped article shaped in accordance with the calibrating modeling data for the high temperature, the left first portion P1L and the left second portion P2L are each configured to be shaped like a single continuous straight line parallel to the Y axis, and the front first portion P1F and the front second portion P2F are each configured to be shaped like a single continuous straight line parallel to the X axis.

In the present embodiment, when no displacement occurs in the relative position between the nozzles 60A, 60B, the distance between the left first portion P1L and the left third portion P3L is equal to the distance between the left second portion P2L and the left third portion P3L, and the distance between the front first portion P1F and the front third portion P3F is equal to the distance between the front second portion P2F and the front third portion P3F. When the displacement in the relative position in the X axis occurs between the nozzles 60A, 60B, the distance between the left first portion P1L and the left third portion P3L is different from the distance between the left second portion P2L and the left third portion P3L. When the displacement in the relative position in the Y axis occurs between the nozzles 60A, 60B, the distance between the front first portion P1F and the front third portion P3F is different from the distance between the front second portion P2F and the front third portion P3F.

In the present embodiment, in the step S250 of the calibration process shown in FIG. 9, the control section 300 obtains the X correction value and the Y correction value input by the user to the operation panel 120 similarly to the first embodiment. The user measures the distance between the left first portion P1L and the left third portion P3L, and the distance between the left second portion P2L and the left third portion P3L to calculate a difference between the distance between the left first portion P1L and the left third portion P3L, and the distance between the left second portion P2L and the left third portion P3L. Further, the user measures the distance between the front first portion P1F and the front third portion P3F, and the distance between the front second portion P2F and the front third portion P3F to calculate a difference between the distance between the front first portion P1F and the front third portion P3F, and the distance between the front second portion P2F and the front third portion P3F. It is possible for the user to measure the distances described above using, for example, a vernier caliper. The user inputs a value obtained by dividing the difference between the distance between the left first portion P1L and the left third portion P3L, and the distance between the left second portion P2L and the left third portion P3L by "2" to the operation panel 120 as the X correction value, and inputs a value obtained by dividing the difference between the distance between the front first portion P1F and the front third portion P3F, and the distance between the front second portion P2F and the front third portion P3F by "2" to the operation panel 120 as the Y correction value.

According to the three-dimensional modeling device 12 in the present embodiment described hereinabove, by the control section 300 executing the calibration process, it is possible to adjust the relative position between the nozzles 60A, 60B to thereby decrease the displacement in the relative position between the nozzles 60A, 60B similarly to the first embodiment.

C. Third Embodiment

Figure 15:
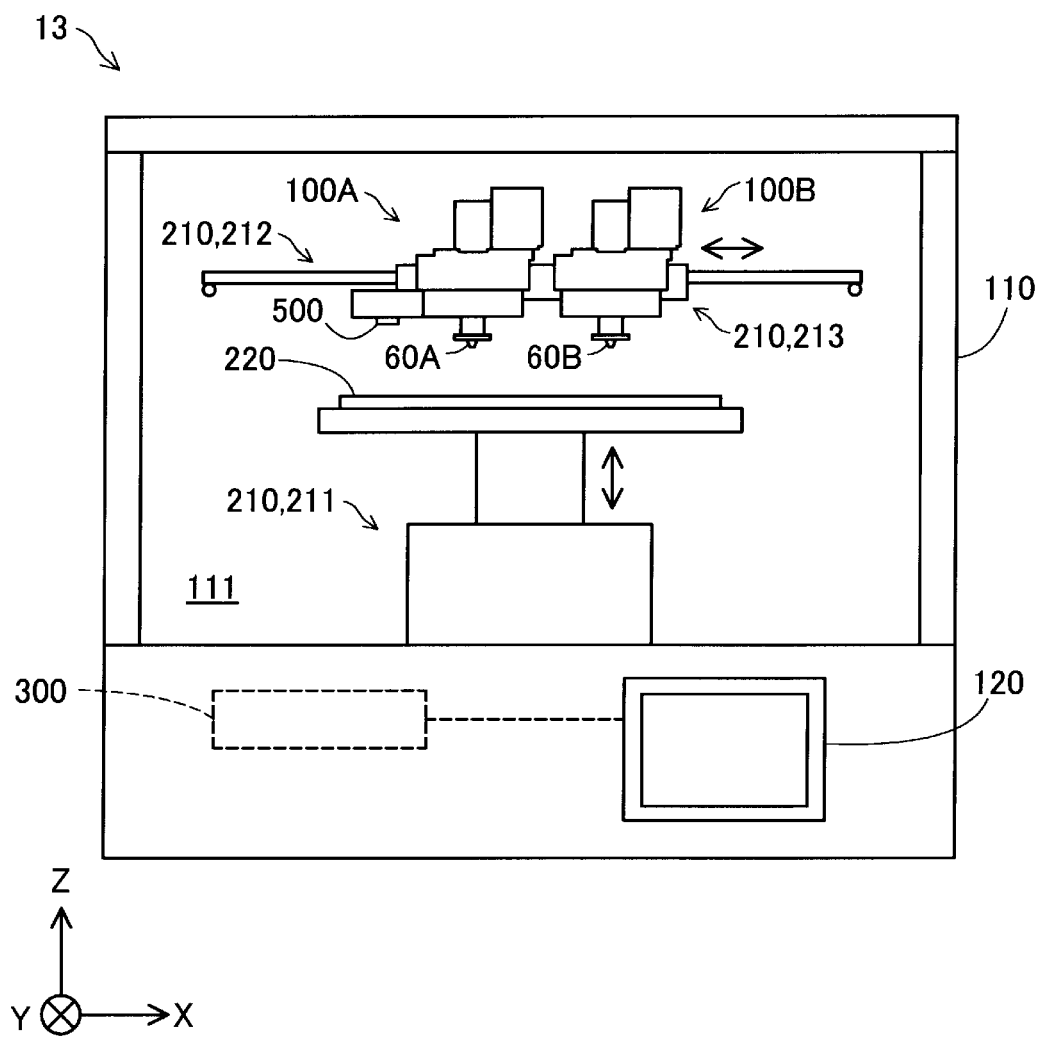
FIG. 15 is a front view showing a schematic configuration of a three-dimensional modeling device according to a third embodiment.

FIG. 15 is a front view showing a schematic configuration of a three-dimensional modeling device 13 according to a third embodiment. The third embodiment is different from the first embodiment in the point that the three-dimensional modeling device 13 is provided with a measurement section 500. The rest of the configuration, the content of the three-dimensional modeling process, and the content of the calibration process are the same as in the first embodiment unless particularly described.

In the present embodiment, the measurement section 500 is fixed to the first ejection section 100A. The measurement section 500 measures the dimensions of the calibrating shaped articles CM1, CM2. The measurement section 500 is formed of a laser scanner, and scans the calibrating shaped articles CM1, CM2 with a laser beam to thereby measure the dimensions of the calibrating shaped articles CM1, CM2. The measurement section 500 is controlled by the control section 300. Information related to the dimensions of the calibrating shaped articles CM1, CM2 measured by the measurement section 500 is transmitted to the control section 300. In another embodiment, the measurement section 500 can be formed of a camera instead of the laser scanner. In this case, the control section 300 can obtain the X correction value, the Y correction value, and the Z correction value by analyzing an image taken by the camera. The measurement section 500 can be fixed to the second ejection section 100B instead of the first ejection section 100A, or can be disposed separately from the first ejection section 100A and the second ejection section 100B.

In the present embodiment, the control section 300 obtains the X correction value and the Y correction value from the measurement section 500 in the step S250 in the calibration process shown in FIG. 9. The measurement section 500 scans the calibrating shaped articles CM1, CM2 with the laser beam to thereby measure the first distance W1 and the second distance W2 in the portions of the calibrating shaped articles CM1, CM2, and then calculates the X correction value and the Y correction value.

The control section 300 obtains the Z correction value from the measurement section 500 in the step S270 in the calibration process. The measurement section 500 scans the fourth portion P4 of the calibrating shaped articles CM1, CM2 with the laser beam to thereby measure the thickness t4 of the fourth portion P4, and then calculates the Z correction value. It should be noted that the measurement section 500 is referred to as a first measurement section or a second measurement section in some cases. Further, the measurement section for measuring the first distance W1 and the second distance W2, and the measurement section for measuring the thickness t4 of the fourth portion P4 can be disposed separately from each other. In this case, the measurement section for measuring the first distance W1 and the second distance W2 is referred to as a first measurement section, and the measurement section for measuring the thickness t4 of the fourth portion P4 is referred to as a second measurement section.

According to the three-dimensional modeling device 13 in the present embodiment described hereinabove, by the control section 300 executing the calibration process, it is possible to adjust the relative position between the nozzles 60A, 60B to thereby decrease the displacement in the relative position between the nozzles 60A, 60B similarly to the first embodiment. In particular, in the present embodiment, since the correction values are calculated by the measurement section 500, and the control section 300 obtains the correction values from the measurement section 500, it is possible to save the effort of the user to calculate and then input the correction values, and at the same time, it is possible to eliminate a possibility that a false correction value is input due to a human error. It should be noted that in the three-dimensional modeling device 13 according to the present embodiment, it is possible for the control section 300 to shape the calibrating shaped article CM3 in the second embodiment.

Further, in the present embodiment, since the control section 300 automatically repeats the shaping of the calibrating shaped articles CM1, CM2, the measurement of the calibrating shaped articles CM1, CM2 by the measurement section 500, and the adjustment of the relative position between the nozzles 60A, 60B, it is possible to surely decrease the displacement in the relative position between the nozzles 60A, 60B.

D. Fourth Embodiment

Figure 16:
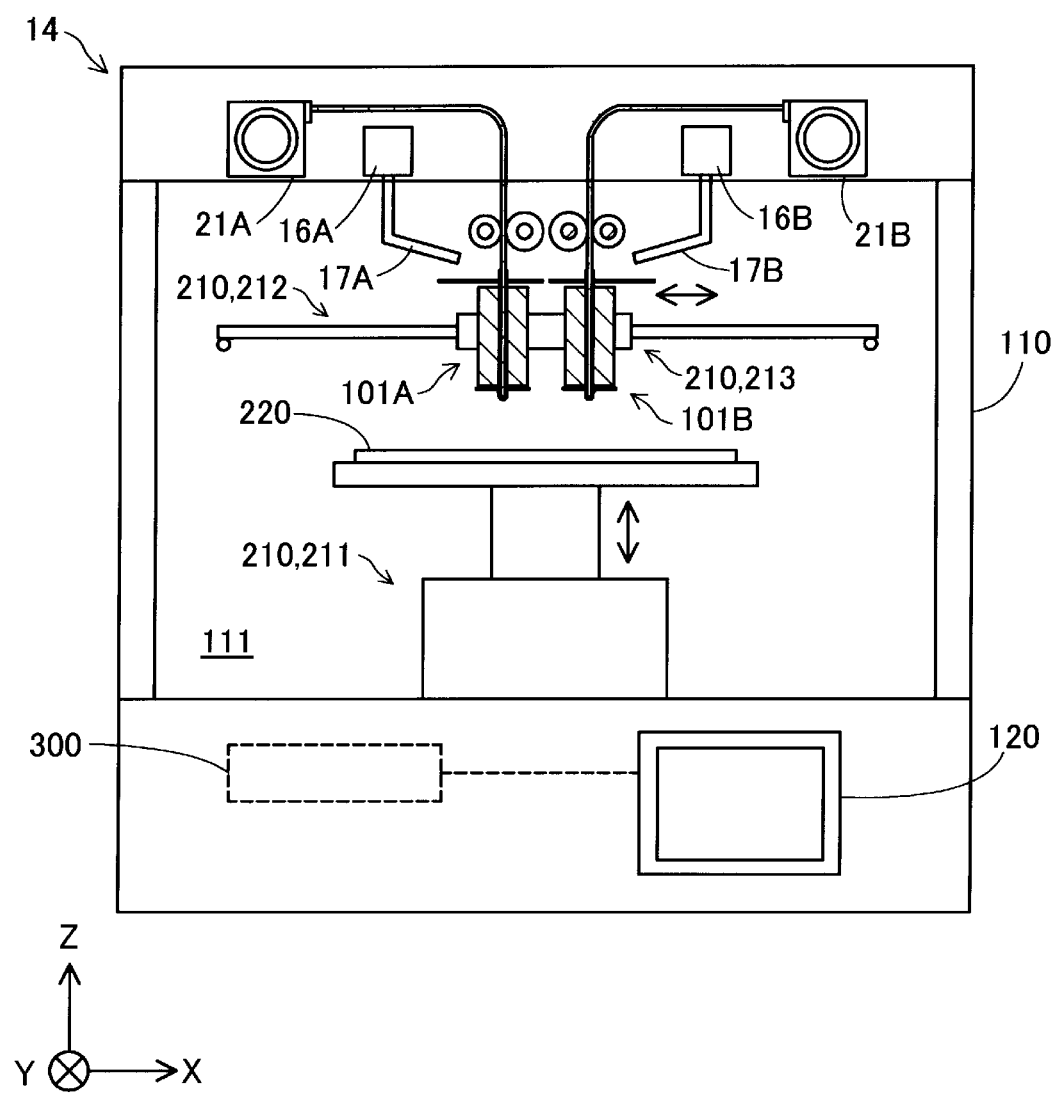
FIG. 16 is an explanatory diagram showing a schematic configuration of a three-dimensional modeling device according to a fourth embodiment.

FIG. 16 is an explanatory diagram showing a schematic configuration of a three-dimensional modeling device 14 according to a fourth embodiment. In the three-dimensional modeling device 14 according to the fourth embodiment, a configuration of the first ejection section 101A and a second ejection section 101B is different from the configuration of the first ejection section 100A and the second ejection section 100B in the first embodiment. The rest of the configuration, the content of the three-dimensional modeling process, and the content of the calibration process are the same as in the first embodiment unless particularly described. Therefore, the configuration of the ejection sections 101A, 101B will mainly be described.

The three-dimensional modeling device 14 according to the present embodiment is provided with the chassis 110, the operation panel 120, the first ejection section 101A, the second ejection section 101B, the drive section 210, the stage 220, and the control section 300. The configuration of the second ejection section 101B is the same as the configuration of the first ejection section 101A. In the following description, when describing the first ejection section 101A and the second ejection section 101B without particularly discriminating the first ejection section 101A and the second ejection section 101B from each other, the first ejection section 101A and the second ejection section 101B are simply referred to as ejection sections 101.

In the present embodiment, in the modeling space 111 in the chassis 110, there are housed the first ejection section 101A, the second ejection section 101B, and the stage 220. The three-dimensional modeling device 14 is further provided with two blowers 16A, 16B. The blower 16A is configured as a blower machine for feeding air toward the first ejection section 101A via a manifold 17A, and the blower 16B is configured as a blower machine for feeding air toward the second ejection section 101B via a manifold 17B.

In the present embodiment, a material housing section 21A for housing the first material is arranged separately from the first ejection section 101A, and a material housing section 21B for housing the second material is arranged separately from the second ejection section 101B. The material housing sections 21A, 21B are fixed to the chassis 110. The material housing sections 21A, 21B are each configured as a holder for housing a material in the form of a filament. The material housing sections 21A, 21B are configured to be able to wind out the material housed inside to the outside of the material housing section 21A, 21B, respectively.

Figure 17:
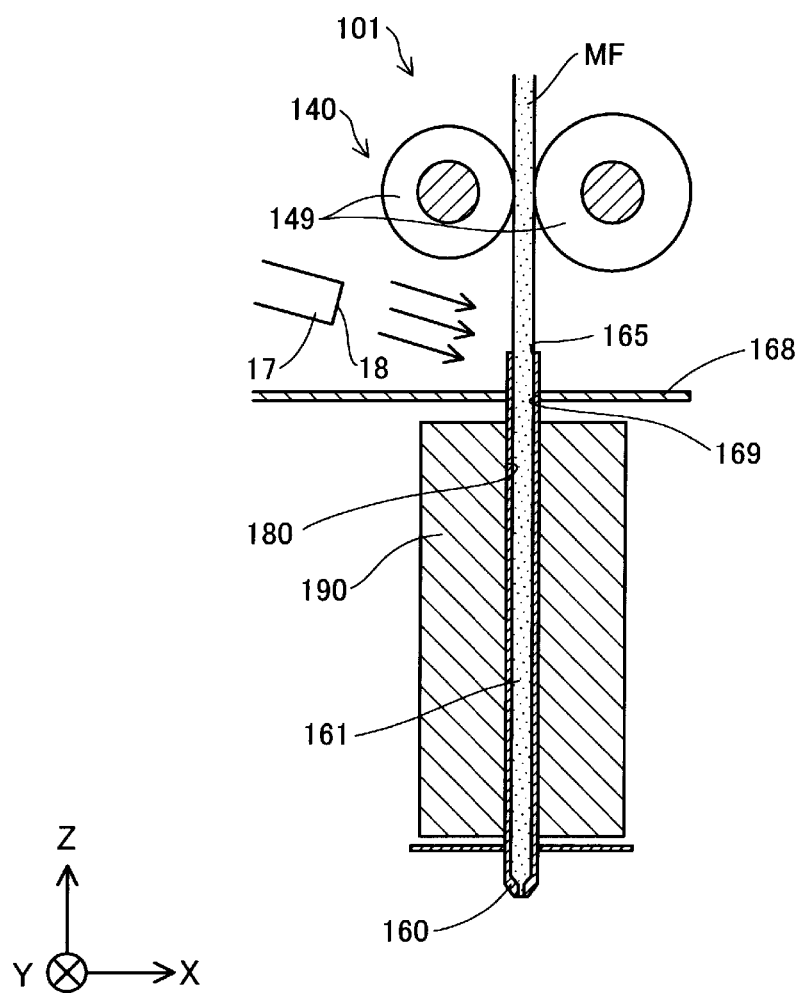
FIG. 17 is an explanatory diagram showing a schematic configuration of an ejection section in a fourth embodiment.

FIG. 17 is an explanatory diagram showing a schematic configuration of the ejection section 101 in the present embodiment. The ejection section 101 is provided with a heating block 190 which has a heater, and functions as a plasticizing mechanism provided with an attachment hole 180, a nozzle 160 detachably attached to the attachment hole 180, and a material carrying mechanism 140 for carrying the material MF toward a nozzle channel 161 of the nozzle 160 attached to the heating block 190. The ejection section 101 is further provided with a shield 168 which is disposed between the material carrying mechanism 140 in the Z axis and the heating block 190, and suppresses the heat transfer from the heating block 190 to the material carrying mechanism 140. In the present embodiment, the material carrying mechanism 140 is constituted by two wheels 149 without including the screw case 31 and the flat screw 41 unlike the first embodiment. The heating block 190 is not provided with the barrel 50 and the case section 91 unlike the first embodiment. The heating block 190 incorporates a heater not shown.

The nozzle 160 in the present embodiment is inserted through the attachment hole 180 and a shield opening 169 provided to the shield 168 from the −Z direction to thereby be attached to the heating block 190. In other words, in the present embodiment, the length of the nozzle 160 along the Z axis, and the length of the nozzle channel 161 along the Z axis are longer than the length of the attachment hole 180 along the Z axis. Therefore, in the present embodiment, the inflow port 165 provided to a rear end of the nozzle 160 is located at the +Z direction side with respect to the heating block 190, more specifically, at the +Z direction side with respect to the shield 168.

The two wheels 149 constituting the material carrying mechanism 140 pull out the material MF in the material housing section 21 to the outside to guide the material MF between the two wheels 149, and at the same time, carry the material MF toward the nozzle channel 161 of the nozzle 160 due to the rotation thereof. The heating block 190 plasticizes the material MF having been carried inside the nozzle channel 161 due to the heat of a heater not shown incorporated in the heating block 190.

The material MF in the present embodiment is cooled by the air fed from the blower 16 described above via the manifold 17 in the vicinity of the inflow port 165 of the nozzle 160. Thus, the plasticization of the material MF in the vicinity of the inflow port 165 is suppressed, and the material MF is efficiently carried into the inflow port 165. It should be noted that the output end 18 of the manifold 17 is located at the +Z direction side with respect to the shield 168. Thus, since the air fed from the manifold 17 becomes easy to be guided to the vicinity of the inflow port 165 by the shield 168, the material MF in the vicinity of the inflow port 165 is efficiently cooled.

According to the three-dimensional modeling device 14 in the present embodiment described hereinabove, by the control section 300 executing the calibration process, it is possible to adjust the relative position between the nozzles 160A, 160B to thereby decrease the displacement in the relative position between the nozzles 160A, 160B similarly to the first embodiment. It should be noted that in the three-dimensional modeling device 14 according to the present embodiment, it is possible for the control section 300 to execute the calibration process of the second embodiment. Further, it is possible for the three-dimensional modeling device 14 to be provided with the measurement section 500 similarly to the third embodiment, and it is possible for the control section 300 to execute the calibration process of the third embodiment.

E. Other Embodiments (E1) In the three-dimensional modeling devices 11 through 14 according to the embodiments described above, the control section 300 moves the second ejection section 100B, 101B to thereby adjust the relative position of the second nozzle 60B, 160B to the first nozzle 60A, 160A in the calibration process. In contrast, it is possible for the control section 300 to move the first ejection section 100A, 101A instead of the second ejection section 100B, 101B to thereby adjust the relative position of the second nozzle 60B, 160B to the first nozzle 60A, 160A, or to move both of the first ejection section 100A, 101A and the second ejection section 100B, 101B to thereby adjust the relative position of the second nozzle 60B, 160B to the first nozzle 60A, 160A in the calibration process.

(E2) In the three-dimensional modeling devices 11 through 14 according to the embodiments described above, it is possible for the control section 300 to shape the shaped article representing at least one of the type of the first nozzle 60A, 160A mounted on the first ejection section 100A, 101A and the type of the second nozzle 60B, 160B mounted on the second ejection section 100B, 101B together with the calibrating shaped articles CM1 through CM3 in the calibration process. It is possible for the control section 300 to obtain the information related to the types of the nozzles 60A, 60B, 160A, and 160B input, for example, in advance by the user. In this case, it is possible to make it easy to make the user recognize the types of the nozzles 60A, 60B, 160A, and 160B mounted on the respective ejection sections 100A, 100B, 101A, and 101B.

(E3) In the three-dimensional modeling devices 11 through 14 according to the embodiments described above, the length along the X axis and the length along the Y axis of the calibrating shaped article CM2 shaped by the control section 300 in accordance with the calibrating modeling data for the high-temperature material are longer than the length along the X axis and the length along the Y axis of the calibrating shaped article CM1 shaped by the control section 300 in accordance with the calibrating modeling data for the low-temperature material, respectively. In contrast, the length along the X axis and the length along the Y axis of the calibrating shaped article CM2 shaped by the control section 300 in accordance with the calibrating modeling data for the high-temperature material can be the same as the length along the X axis and the length along the Y axis of the calibrating shaped article CM1 shaped by the control section 300 in accordance with the calibrating modeling data for the low-temperature material, respectively. Further, the control section 300 is not required to make the calibrating modeling data different between when using the low-temperature material and when using the high-temperature material. In other words, it is possible to shape the calibrating shaped article the same in shape when using the low-temperature material and when using the high-temperature material.

(E4) In the three-dimensional modeling devices 11, 13, and 14 according to the first embodiment, the third embodiment, and the fourth embodiment described above, the control section 300 shapes the calibrating shaped articles CM1, CM2 having the plurality of first portions P1 arranged with the offsets therebetween, the plurality of second portions P2 arranged with the offsets therebetween, and the third portion P3 arranged on a straight line between the first portions P1 and the second portions P2. In contrast, it is possible for the control section 300 to shape the calibrating shaped article having a plurality of first portions P1 arranged on a straight line, a plurality of second portions P2 arranged on a straight line, and a plurality of third portions P3 arranged between the first portions P1 and the second portions P2 with offsets therebetween. Further, in the offset amount displaying shaped articles DM1, it is possible to represent offset amounts of the third portions P3. Also in this case, it is possible for the user to figure out the correction values which should be input by figuring out the position where the distance between the first portion P1 and the third portion P3 and the distance between the second portion P2 and the third portion P3 are equal to each other.

(E5) In the three-dimensional modeling devices 11 through 14 according to the embodiments described above, the control section 300 adjusts the relative position of the second nozzle 60B, 160B to the first nozzle 60A, 160A in the Z axis in the calibration process. In contrast, the control section 300 is not required to adjust the relative position of the second nozzle 60B, 160B to the first nozzle 60A, 160A in the Z axis in the calibration process.

(E6) In the three-dimensional modeling devices 11 through 14 according to the embodiments described above, the control section 300 stores the execution history data of the calibration process. In contrast, the control section 300 is not required to store the execution history data of the calibration process. In this case, it is possible to simplify the calibration process.

F. Other Aspects

The present disclosure is not limited to the embodiments described above, but can be implemented in a variety of aspects within the scope or the spirit of the present disclosure. For example, the present disclosure can also be implemented in the following aspects. The technical features in the embodiments described above corresponding to the technical features in each of the aspects described below can arbitrarily be replaced or combined in order to solve some or all of the problems of the present disclosure, or to achieve some or all of the advantages of the present disclosure. Further, the technical feature can arbitrarily be eliminated unless described in the present specification as an essential element.

(1) According to a first aspect of the present disclosure, there is provided a three-dimensional modeling device. The three-dimensional modeling device includes a first ejection section configured to eject a first material toward a stage, a second ejection section configured to eject a second material toward the stage, a drive section configured to move each of the first ejection section and the second ejection section relatively to the stage, and a control section configured to control the first ejection section, the second ejection section, and the drive section. The control section executes a calibration process including a first process of ejecting the first material from the first ejection section to thereby shape a first portion and a second portion shaped like straight lines arranged in parallel to the stage and in parallel to each other in a calibrating shaped article to be shaped on the stage, a second process of ejecting the second material from the second ejection section to thereby shape a third portion shaped like a straight line arranged between the first portion and the second portion in the calibrating shaped article, and a third process of controlling the drive section in accordance with a correction value obtained based on relative positions of the third portion to the first portion and the second portion to thereby adjust a relative position of the second ejection section to the first ejection section. The control section executes the first process and the second process once again when the third process is executed in the calibration process.

According to the three-dimensional modeling device of this aspect, even when a displacement occurs in the relative position of the second ejection section to the first ejection section, it is possible to adjust the relative position of the second ejection section to the first ejection section due to the calibration process. Therefore, it is possible to shape the three-dimensional shaped article with high dimensional accuracy.

(2) In the three-dimensional modeling device according to the aspect described above, in the calibration process, the control section may shape the calibrating shaped article in an area which is an area on the stage, and is designated by the user.

According to the three-dimensional modeling device of this aspect, it is possible to shape the calibrating shaped article at the position desired by the user.

(3) In the three-dimensional modeling device according to the aspect described above, the calibrating shaped article may have a plurality of the first portions and a plurality of the second portions arranged side by side along a first axis parallel to the first portion and the second portion, the control section may vary a position of the first ejection section in a second axis which is perpendicular to the first axis, and is parallel to the stage by the first portion and the second portion when shaping the plurality of the first portions and the plurality of the second portions, and the correction value may be a value corresponding to a variation in the position of the first ejection section in the second axis when a difference between a distance between the first portion and the third portion and a distance between the second portion and the third portion is minimum.

According to the three-dimensional modeling device of this aspect, it is possible to use the value corresponding to the variation in the position of the first ejection section as the correction value.

(4) In the three-dimensional modeling device according to the aspect described above, the control section may shape a shaped article, which represents the variation in the position of the first ejection section when each of the first portions and the second portions is shaped, at a position corresponding to each of the first portions and the second portions in advance of the third process.

According to the three-dimensional modeling device of this aspect, it is possible to make it easy to make the user recognize the variation in the position of the first ejection section.

(5) In the three-dimensional modeling device according to the aspect described above, the calibrating shaped article may have a plurality of the third portions arranged side by side along a first axis parallel to the first portion and the second portion, the control section may vary a position of the second ejection section in a second axis which is perpendicular to the first axis, and is parallel to the stage by the third portion when shaping the plurality of the third portions, and the correction value may be a value corresponding to a variation in the position of the second ejection section in the second axis when a difference between a distance between the first portion and the third portion and a distance between the second portion and the third portion is minimum.

According to the three-dimensional modeling device of this aspect, it is possible to use the value corresponding to the variation in the position of the second ejection section as the correction value.

(6) In the three-dimensional modeling device according to the aspect described above, the control section may shape a shaped article, which represents the variation in the position of the second ejection section when each of the third portions is shaped, at a position corresponding to each of the third portions in advance of the third process.

According to the three-dimensional modeling device of this aspect, it is possible to make it easy to make the user recognize the variation in the position of the second ejection section.

(7) In the three-dimensional modeling device according to the aspect described above, the control section may shape a shaped article representing a unit of the correction value in advance of the third process.

According to the three-dimensional modeling device of this aspect, it is possible to suppress the false recognition of the unit of the correction value by the user.

(8) In the three-dimensional modeling device according to the aspect described above, the control section may shape a shaped article representing at least one of a type of the first material and a type of the second material in advance of the third process.

According to the three-dimensional modeling device of this aspect, it is possible to make it easy to make the user recognize the type of the material.

(9) In the three-dimensional modeling device according to the aspect described above, the control section may make a shape of the calibrating shaped article different by a type of the first material or a type of the second material.

According to the three-dimensional modeling device of this aspect, by adopting a shape corresponding to the type of the material as the shape of the calibrating shaped article, it is possible to prevent the calibrating shaped article from deforming when the material cools to shrink.

(10) In the three-dimensional modeling device according to the aspect described above, when at least one of a melting temperature of the first material and a melting temperature of the second material exceeds a predetermined temperature, the control section may shape the calibrating shaped article having a larger shape compared to when at least one of the melting temperature of the first material and the melting temperature of the second material is no higher than the temperature.

According to the three-dimensional modeling device of this aspect, it is possible to prevent the calibrating shaped article from deforming when the material cools to shrink.

(11) In the three-dimensional modeling device according to the aspect described above, the control section may shape a shaped article representing at least one of a type of a first nozzle which is mounted on the first ejection section, and is configured to eject the first material, and a type of a second nozzle which is mounted on the second ejection section, and is configured to eject the second material in advance of the third process.

According to the three-dimensional modeling device of this aspect, it is possible to make it easy to make the user recognize the type of the nozzle.

(12) In the three-dimensional modeling device according to the aspect described above, the control section may store an execution history representing that the calibration process was executed.

According to the three-dimensional modeling device of this aspect, when an abnormality occurs in the three-dimensional modeling device, it is possible to check the execution history of the calibration process.

(13) In the three-dimensional modeling device according to the aspect described above, there may further be included a first measurement section configured to obtain relative positions of the third portion to the first portion and the second portion, wherein the control section may obtain the correction value from the first measurement section.

According to the three-dimensional modeling device of this aspect, since the control section automatically obtains the correction value from the first measurement section, it is possible to reduce the burden on the user compared to the aspect in which the control section obtains the correction value input by the user.

(14) In the three-dimensional modeling device according to the aspect described above, the control section may repeat the shaping of the calibrating shaped article and the acquisition of the correction value from the first measurement section until the correction value becomes no higher than a predetermined value in the calibration process.

According to the three-dimensional modeling device of this aspect, since the control section automatically repeats the shaping of the calibrating shaped article and the measurement by the first measurement section, it is possible to reduce the burden on the user.

(15) In the three-dimensional modeling device according to the aspect described above, there may further be included a second measurement section configured to measure a thickness of the calibrating shaped article, wherein the calibrating shaped article may have a fourth portion which is shaped with the second material ejected from the second ejection section, and the control section may measure a thickness of the fourth portion with the second measurement section to adjust the position of the second ejection section to the stage so that a distance between the stage and the first ejection section when ejecting the first material and the thickness of the fourth portion become equal to each other after the correction value becomes no higher than a predetermined value in the calibration process.

According to the three-dimensional modeling device of this aspect, since it is possible to decrease the difference in thickness between the layer to be formed of the first material ejected from the first ejection section and the layer to be formed of the second material ejected from the second ejection section, it is possible to shape the three-dimensional shaped article with high dimensional accuracy.

(16) According to a second aspect of the present disclosure, there is provided a method of calibrating a three-dimensional modeling device provided with a first ejection section configured to eject a first material toward a stage, and a second ejection section configured to eject a second material toward the stage. The method of calibrating the three-dimensional modeling device includes a first step of ejecting the first material from the first ejection section to thereby shape a first portion and a second portion shaped like straight lines arranged in parallel to the stage and in parallel to each other in a calibrating shaped article to be shaped on the stage, a second step of ejecting the second material from the second ejection section to thereby shape a third portion shaped like a straight line arranged between the first portion and the second portion in the calibrating shaped article, and a third step of adjusting a relative position of the second ejection section to the first ejection section in accordance with a correction value obtained based on relative positions of the third portion to the first portion and the second portion. When the third step is executed, the first step and the second step are executed once again.

According to the method of calibrating the three-dimensional modeling device of this aspect, even when a displacement occurs in the relative position of the second ejection section to the first ejection section, it is possible to adjust the relative position of the second ejection section to the first ejection section. Therefore, it is possible to shape the three-dimensional shaped article with high dimensional accuracy.

(17) According to a third aspect of the present disclosure, there is provided a method of manufacturing a three-dimensional shaped article. The method of manufacturing a three-dimensional shaped article includes a shaping step of shaping the three-dimensional shaped article using a first ejection section configured to eject a first material toward a stage, and a second ejection section configured to eject a second material toward the stage, and a calibration step of adjusting a relative position of the second ejection section to the first ejection section in advance of the shaping step. The calibration step includes a first step of ejecting the first material from the first ejection section to thereby shape a first portion and a second portion shaped like straight lines arranged in parallel to the stage and in parallel to each other in a calibrating shaped article to be shaped on the stage, a second step of ejecting the second material from the second ejection section to thereby shape a third portion shaped like a straight line arranged between the first portion and the second portion in the calibrating shaped article, and a third step of adjusting a relative position of the second ejection section to the first ejection section in accordance with a correction value obtained based on relative positions of the third portion to the first portion and the second portion. In the calibration step, when the third step is executed, the first step and the second step are executed once again.

According to the method of manufacturing the three-dimensional shaped article of this aspect, even when a displacement occurs in the relative position of the second ejection section to the first ejection section, it is possible to adjust the relative position of the second ejection section to the first ejection section due to the calibration step. Therefore, it is possible to shape the three-dimensional shaped article with high dimensional accuracy in the shaping step.

The present disclosure can be implemented in a variety of aspects other than the three-dimensional modeling device. For example, the present disclosure can also be implemented as an aspect such as a method of calibrating a three-dimensional modeling device, or a method of manufacturing a three-dimensional shaped article.

What is claimed is:

1. A three-dimensional modeling device comprising:
a first ejection section configured to eject a first material toward a stage;
a second ejection section configured to eject a second material toward the stage;
a drive section configured to move each of the first ejection section and the second ejection section relatively to the stage; and
a control section configured to control the first ejection section, the second ejection section, and the drive section, wherein
the control section executes a calibration process including
a first process of ejecting the first material from the first ejection section to thereby shape a first portion and a second portion shaped like straight lines arranged in parallel to the stage and in parallel to each other in a calibrating shaped article to be shaped on the stage,
a second process of ejecting the second material from the second ejection section to thereby shape a third portion shaped like a straight line arranged between the first portion and the second portion in the calibrating shaped article, and
a third process of controlling the drive section in accordance with a correction value obtained based on relative positions of the third portion to the first portion and the second portion to thereby adjust a relative position of the second ejection section to the first ejection section, the control section executes the first process and the second process once again when the third process is executed in the calibration process, the calibrating shaped article has a fourth portion which is shaped with the second material ejected from the second ejection section, the second portion is arranged between the third and fourth portions, a first measurement section is configured to obtain relative positions of the third portion to the first portion and the second portion, the control section obtains the correction value from the first measurement section, the control section repeats the shaping of the calibrating shaped article and the acquisition of the correction value from the first measurement section until the correction value becomes no higher than a predetermined value in the calibration process, a second measurement section is configured to measure a thickness of the calibrating shaped article, and the control section measures a thickness of the fourth portion with the second measurement section to adjust the position of the second ejection section to the stage so that a distance between the stage and the first ejection section when ejecting the first material and the thickness of the fourth portion become equal to each other after the correction value becomes no higher than a predetermined value in the calibration process.

2. The three-dimensional modeling device according to claim 1, wherein in the calibration process, the control section shapes the calibrating shaped article in an area which is an area on the stage, and is designated by the user.

3. The three-dimensional modeling device according to claim 1, wherein the calibrating shaped article has a plurality of the first portions and a plurality of the second portions arranged side by side along a first axis parallel to the first portion and the second portion, the control section varies a position of the first ejection section in a second axis which is perpendicular to the first axis, and is parallel to the stage by the first portion and the second portion when shaping the plurality of the first portions and the plurality of the second portions, and the correction value is a value corresponding to a variation in the position of the first ejection section in the second axis when a difference between a distance between the first portion and the third portion and a distance between the second portion and the third portion is minimum.

4. The three-dimensional modeling device according to claim 3, wherein the control section shapes a shaped article, which represents the variation in the position of the first ejection section when each of the first portions and the second portions is shaped, at a position corresponding to each of the first portions and the second portions in advance of the third process.

5. The three-dimensional modeling device according to claim 1, wherein the calibrating shaped article has a plurality of the third portions arranged side by side along a first axis parallel to the first portion and the second portion, the control section varies a position of the second ejection section in a second axis which is perpendicular to the first axis, and is parallel to the stage by the third portion when shaping the plurality of the third portions, and the correction value is a value corresponding to a variation in the position of the second ejection section in the second axis when a difference between a distance between the first portion and the third portion and a distance between the second portion and the third portion is minimum.

6. The three-dimensional modeling device according to claim 5, wherein the control section shapes a shaped article, which represents the variation in the position of the second ejection section when each of the third portions is shaped, at a position corresponding to each of the third portions in advance of the third process.

7. The three-dimensional modeling device according to claim 1, wherein the control section shapes a shaped article representing a unit of the correction value in advance of the third process.

8. The three-dimensional modeling device according to claim 1, wherein the control section shapes a shaped article representing at least one of a type of the first material and a type of the second material in advance of the third process.

9. The three-dimensional modeling device according to claim 1, wherein the control section makes a shape of the calibrating shaped article different by a type of the first material or a type of the second material.

10. The three-dimensional modeling device according to claim 1, wherein when at least one of a melting temperature of the first material and a melting temperature of the second material exceeds a predetermined temperature, the control section shapes the calibrating shaped article having a larger shape compared to when at least one of the melting temperature of the first material and the melting temperature of the second material is no higher than the predetermined temperature.

11. The three-dimensional modeling device according to claim 1, wherein the control section shapes a shaped article representing at least one of a type of a first nozzle which is mounted on the first ejection section, and is configured to eject the first material, and a type of a second nozzle which is mounted on the second ejection section, and is configured to eject the second material in advance of the third process.

12. The three-dimensional modeling device according to claim 1, wherein the control section stores an execution history representing that the calibration process was executed.

13. The three-dimensional modeling device according to claim 1, wherein the second portion is arranged between the third and fourth portions, a first distance between the first portion and the third portion and a second distance between the second portion and the third portion are equal to each other, and a third distance between the second portion and the fourth portion is greater than the first and second distances.

14. A method of calibrating a three-dimensional modeling device provided with a first ejection section configured to eject a first material toward a stage, and a second ejection section configured to eject a second material toward the stage, the method comprising:
- a first step of ejecting the first material from the first ejection section to thereby shape a first portion and a second portion shaped like straight lines arranged in parallel to the stage and in parallel to each other in a calibrating shaped article to be shaped on the stage;
- a second step of ejecting the second material from the second ejection section to thereby shape a third portion shaped like a straight line arranged between the first portion and the second portion in the calibrating shaped article; and
- a third step of adjusting a relative position of the second ejection section to the first ejection section in accordance with a correction value obtained based on relative positions of the third portion to the first portion and the second portion, wherein
- when the third step is executed, the first step and the second step are executed once again,
- the calibrating shaped article has a fourth portion which is shaped with the second material ejected from the second ejection section,
- the second portion is arranged between the third and fourth portions,
- a first measurement section is configured to obtain relative positions of the third portion to the first portion and the second portion,
- the control section obtains the correction value from the first measurement section,
- the control section repeats the shaping of the calibrating shaped article and the acquisition of the correction value from the first measurement section until the correction value becomes no higher than a predetermined value in the calibration process,
- a second measurement section is configured to measure a thickness of the calibrating shaped article, and
- the control section measures a thickness of the fourth portion with the second measurement section to adjust the position of the second ejection section to the stage so that a distance between the stage and the first ejection section when ejecting the first material and the thickness of the fourth portion become equal to each other after the correction value becomes no higher than a predetermined value in the calibration process.

15. A method of manufacturing a three-dimensional shaped article, comprising:
- a shaping step of shaping the three-dimensional shaped article using a first ejection section configured to eject a first material toward a stage, and a second ejection section configured to eject a second material toward the stage; and
- a calibration step of adjusting a relative position of the second ejection section to the first ejection section in advance of the shaping step, wherein the calibration step includes
- a first step of ejecting the first material from the first ejection section to thereby shape a first portion and a second portion shaped like straight lines arranged in parallel to the stage and in parallel to each other in a calibrating shaped article to be shaped on the stage,
- a second step of ejecting the second material from the second ejection section to thereby shape a third portion shaped like a straight line arranged between the first portion and the second portion in the calibrating shaped article, and
- a third step of adjusting a relative position of the second ejection section to the first ejection section in accordance with a correction value obtained based on relative positions of the third portion to the first portion and the second portion, wherein in the calibration step, when the third step is executed, the first step and the second step are executed once again,
the calibrating shaped article has a fourth portion which is shaped with the second material ejected from the second ejection section,
the second portion is arranged between the third and fourth portions,
a first measurement section is configured to obtain relative positions of the third portion to the first portion and the second portion,
the control section obtains the correction value from the first measurement section,
the control section repeats the shaping of the calibrating shaped article and the acquisition of the correction value from the first measurement section until the correction value becomes no higher than a predetermined value in the calibration process,
a second measurement section is configured to measure a thickness of the calibrating shaped article, and
the control section measures a thickness of the fourth portion with the second measurement section to adjust the position of the second ejection section to the stage so that a distance between the stage and the first ejection section when ejecting the first material and the thickness of the fourth portion become equal to each other after the correction value becomes no higher than a predetermined value in the calibration process.

* * * * *